US008976272B2

(12) United States Patent
Fukui et al.

(10) Patent No.: US 8,976,272 B2
(45) Date of Patent: Mar. 10, 2015

(54) IMAGING APPARATUS WHICH CORRECTS EFFECTS OF FLASH

(75) Inventors: Katsuyuki Fukui, Osaka (JP); Ryoji Asada, Osaka (JP); Yasushi Fukushima, Osaka (JP); Tadayuki Inoue, Hyogo (JP); Kazumasa Motoda, Osaka (JP); Takamasa Yokoyama, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 561 days.

(21) Appl. No.: 13/254,311

(22) PCT Filed: Feb. 24, 2010

(86) PCT No.: PCT/JP2010/001252
§ 371 (c)(1),
(2), (4) Date: Sep. 1, 2011

(87) PCT Pub. No.: WO2010/100866
PCT Pub. Date: Sep. 10, 2010

(65) Prior Publication Data
US 2011/0317029 A1 Dec. 29, 2011

(30) Foreign Application Priority Data
Mar. 3, 2009 (JP) .................................. 2009-049361

(51) Int. Cl.
*H04N 5/217* (2011.01)
*H04N 5/235* (2006.01)
(52) U.S. Cl.
CPC ............. *H04N 5/2354* (2013.01); *H04N 5/217* (2013.01)
USPC .......................................... 348/241; 348/371

(58) Field of Classification Search
USPC ............ 348/224.1, 225.1, 241, 371; 382/275, 382/274
See application file for complete search history.

(56) References Cited

U.S. PATENT DOCUMENTS

| 5,912,699 A | 6/1999 | Hayenga et al. |
| 2008/0232765 A1 | 9/2008 | Patten et al. |

FOREIGN PATENT DOCUMENTS

| CN | 101179663 | 5/2008 |
| JP | 6-205374 | 7/1994 |
| JP | 2006-246400 | 9/2006 |
| JP | 2007-306225 | 11/2007 |

OTHER PUBLICATIONS

International Search Report issued May 25, 2010 in International (PCT) Application No. PCT/JP2010/001252.
Chinese Office Action along with English translation issued Sep. 3, 2013 in corresponding Chinese Application No. 201080010516.4.
(Continued)

*Primary Examiner* — Paul Berardesca
(74) *Attorney, Agent, or Firm* — Wenderoth, Lind & Ponack, L.L.P.

(57) ABSTRACT

In an imaging apparatus, unevenness in brightness in screen due to flash is eliminated and video with secured continuity as a moving image can be obtained. In the imaging apparatus (1), signals of fields affected by flash among video signals acquired by imaging are treated with adding or adding and averaging to equalize effects of flash which appear unevenly on a screen.

15 Claims, 15 Drawing Sheets

(56) References Cited

OTHER PUBLICATIONS

Extended European Search Report issued Dec. 4, 2013 in corresponding European Application No. 10748468.5.

Bradley et al., "Synchronization and Rolling Shutter Compensation for Consumer Video Camera Arrays" Computer Vision and Pattern Recognition Workshops, 2009. CVPR Workshops 2009. IEEE Computer Society Conference on, IEEE, Piscataway, NJ, USA, Jun. 20, 2009, pp. 1-8, XP031606989, ISBN: 978-1-4244-3994-2 *p. 3, right-hand column, paragraph 2-3; figure 2*.

IMAGING APPARATUS WHICH CORRECTS EFFECTS OF FLASH

TECHNICAL FIELD

The present invention relates to a technique which can be applied to imaging apparatuses such as digital cameras, video cameras, and the like, which take continuous images and to an imaging apparatus which can mitigate negative effects of external flash.

BACKGROUND ART

In an image taken (obtained) by an imaging apparatus (camera or the like), sometimes, a screen may suddenly become too bright due to external flash such as a flash of the imaging apparatus. If the imaging apparatus (camera or the like) is the one which employs a CCD-type imaging element (CCD-type image sensor), the effects of the external flash appear almost evenly on the screen of the captured image. This is because an operation to send charges from a photodiode, which is provided for each of pixels of the CCD-type imaging element, to a charge coupled device (CCD), which is to become a buffer, is performed for all the photodiodes at the same time.

However, a CMOS-type imaging element (CMOS-type image sensor), which has recently become popular to be integrated into an imaging apparatus (camera or the like), sends charges (stored charges) of photodiodes provided for each of the pixels of the CMOS-type imaging element to portions to become a buffer from the top of the screen (imaging element surface). Thus, in the CMOS-type imaging element, there is a lag between a period during which charges stored by photodiodes arranged in an upper portion of the screen (imaging element surface) are transferred to a buffer and a period during which charges stored by photodiodes arranged in an lower portion of the screen (imaging element surface) are transferred to a buffer.

For example, if strong light of a flash enters a CMOS-type imaging element in a period as shown in FIG. 17A, "Field 2" is affected by flash light in a lower portion of a screen of the captured image obtained by such a CMOS-type imaging element, and "Field 3" is affected in an upper portion of the screen as shown in FIG. 17A. As a result, as shown in FIG. 17B, in "Field 2", only a lower portion of the screen of the captured image becomes bright, and in "Field 3", only an upper portion of the screen of the captured image becomes bright. Since the light of the flash is strong light, in the taken video (image) in such a circumstance, the brightened portion is often washed out (so-called "overexposure" phenomenon happens), and has a white band shape (a portion with a high intensity in a white band shape appears on an image (video)).

With respect to such video, the technique disclosed in Patent literature 1 (a conventional imaging apparatus) does not record fields including a band-shape video caused by flash in recording the video, and, instead, record the prior or following video which is not affected by the band-shape video. For example, with respect to the video as shown in FIG. 17B, video (image) of "Field 1" is recorded instead of video (image) of "Field 2" and video (image) of "Field 3" in the conventional imaging apparatus.

CITATION LIST

Patent Literature

Patent Literature 1: Laid-open Patent Publication No. 2007-306225

SUMMARY

Technical Problem

The conventional method (conventional imaging apparatus) works for taking still images. However, in taking moving images, video becomes non-continuous in a part where an image is replaced for reducing effects of flash, resulting in awkwardness. Furthermore, in the video taken by the conventional method (conventional imaging apparatus), the video with flash does not remain. Thus, it is impossible to know whether there is flash or not (when a scene with actual flash is imaged with the conventional imaging apparatus, there is no flash in the captured image even though there actually was flash, resulting in that the real scene is not reproduced correctly).

The present invention is to solve the above-described conventional problem, and an object thereof is to provide an imaging apparatus, an imaging method, a program and an integrated circuit which eliminate an unnatural screen (captured image) with a bright band caused by external flash and output image (video) with secured continuity as a moving image while making it possible to know whether there is flash or not.

Solution to Problem

The first aspect is an imaging apparatus including an imaging unit, a flash detection unit, and a flash correction unit.

The imaging unit has an imaging element and is operable to convert an optical signal incident from an object into an electrical signal to acquire and output a video signal. The flash detection unit is operable to detect whether the video signal acquired by the imaging unit is affected by flash or not. The flash correction unit is operable to correct the video signal output from the imaging unit when the video signal acquired by the imaging unit is determined by the flash detection unit to be affected by flash, using the video signal determined to be affected by flash.

In the imaging apparatus, with the structure as described above, the video signal output from the imaging unit is corrected when the video signal acquired by the imaging unit is determined to be affected by flash, using the video signal determined to be affected by flash. In this way, the imaging apparatus can eliminate an unnatural screen with a bright band caused by external flash and can obtain video (image) with secured continuity as a moving image while allowing to know whether flash enters the imaging apparatus or not.

The second aspect is the first aspect in which, when the flash detection unit determines that Nth video signal, which is a video signal forming an Nth unit image (N is integer), and (N+1)th video signal, which is a video signal forming an (N+1)th unit image (N is integer), are affected by flash, the flash correction unit generates a corrected video signal using the Nth video signal and the (N+1)th video signal, and corrects the video signal output from the imaging unit by replacing the video signal output from the imaging unit with the corrected video signal.

In this way, on screens formed by Nth video signal and (N+1)th video signal affected by flash (Nth screen and (N+1) th screen), an unnatural screen with a bright band caused by external flash can be eliminated and video (image) with secured continuity as a moving image can be obtained while allowing to know whether flash enters the imaging apparatus or not.

Herein, the term "unit image" refers to an image formed of a video signal (image signal), and an unit image can form one screen on a display device. For example, a field image (video) and a frame image (video) fall within the "unit image".

Herein, the term "replacing" refers to a concept which includes partial replacing. For example, the term "replacing" includes partial replacing as described below.

When the "unit image" is a field image, given that the first field image is not affected by external flash, the second and third field images are affected by external flash, and the fourth field image is not affected by external flash:

(1) the second field image is replaced with the first field image which is not affected by external flash; and (2) the third field image is replaced with a corrected image generated by adding the second field image and the third field image which are affected by external flash.

As described above, the term "replacing" includes replacing only one field image out of two field images which are affected by external flash with a corrected image generated by the field images affected by external flash.

The third aspect is the first or the second aspect in which the flash correction unit has a first selecting portion, a delaying portion and an output selecting portion.

The first selecting portion is operable to receive a plurality of video signals as inputs and to select and output one of video signals from the input plurality of video signals based on a detection result at the flash detection unit. The delaying portion is operable to delay and output the video signal output from the first selecting portion by a unit image time period, which is a time period corresponding to a unit image formed of a video signal. The adding portion is operable to treat the video signal output from the imaging unit and the video signal output from the delaying portion with an adding process and output the video signals treated with the process. The output selecting portion is operable to select and output either the video signal output from the adding portion or the video signal output from the delaying portion.

The first selecting portion is operable to receive the video signal output from the imaging unit and the video signal output from the adding portion as inputs, and, when the flash detection unit determines that the video signal output from the imaging unit is not affected by flash, select and output the video signal output from the imaging unit, and, when the flash detection unit determines that the video signal output from the imaging unit is affected by flash, to select and output the video signal output from the adding portion. The output selecting portion is operable to select and output the video signal output from the delaying portion to output when the flash detection unit determines that the video signal output from the imaging unit is not affected by flash, and, when the flash detection unit determines that the video signal output from the imaging unit is affected by flash, to select and output the video signal output from the adding portion.

With such a structure, in this imaging apparatus, a unit image (for example, a field image or frame image) which is brightened due to effects of flash in a part of the screen (for example, a screen upper portion or a screen lower portion) can be detected, and the unit image can be corrected using the image area (for example, a screen upper portion or a screen lower portion) which is brightened due to effects of flash. As a result, effects of flash can be prevented from unnaturally appearing on video obtained by the imaging apparatus.

In this way, the imaging apparatus can eliminate an unnatural screen with a bright band caused by external flash and can obtain video (image) with secured continuity as a moving image while allowing to know whether flash enters the imaging apparatus or not.

Herein, the term "unit image" refers to an image formed of a video signal (image signal), and an unit image can form one screen on a display device. For example, a field image (video) and a frame image (video) fall within the "unit image".

Further, the term "unit image time period" refers to a time period required for forming a unit image of a video signal. For example, when a "unit image" is a "field image", the "unit image time period" is a "field time period", and when a "unit image" is a "frame image", the "unit image time period" is a "frame time period".

The fourth aspect is the third aspect in which the adding portion is operable to perform the adding process by adding the video signal output from the imaging unit and the video signal output from the delaying portion.

The fifth aspect is the third aspect in which the adding portion is operable to perform the adding process by adding and averaging the video signal output from the imaging unit and the video signal output from the delaying portion.

With such a structure, a signal value of a video signal acquired by the imaging apparatus can be prevented from being too large. Thus, so-called "overexposure" phenomenon and the like can be efficiently prevented from occurring due to effects of flash.

The wordings "adding and averaging" includes not only adding and averaging two video signals but also weighting two video signals with "½" and then adding. Further, it also includes addition with weighting with values other than "½".

The sixth aspect is the first or the second aspect in which the flash detection unit is operable to detect whether the video signal acquired by the imaging unit is affected by flash or not and retains a detection result which is prior by one unit image time period, that is a time period corresponding to a unit image formed of a video signal.

The flash correction unit has a first selecting portion, a delaying portion, and an outputting portion.

The first selecting portion is operable to receive a plurality of video signals as inputs and to select and output one of video signals from the input plurality of video signals based on the detection result at the flash detection unit. The delaying portion is operable to delay and output the video signal output from the first selecting portion by one unit image time period. The output selecting portion is operable to select and output either the video signal output from the imaging unit or the video signal output from the delaying portion.

When the flash detection unit determines that the video signal corresponding to a lower portion of a screen of a unit image formed of a video signal which is prior by one unit image is affected by flash, the first selecting portion selects and outputs the video signal output from the delaying portion for a period of time corresponding to the lower portion of the screen in a unit image being processed, and, otherwise, selects and outputs the video signal output from the imaging unit to output. When the flash detection unit determines that the video signal corresponding to an upper portion of a screen of a unit image formed of a video signal is affected by flash, the output selecting portion selects and outputs the video signal output from the imaging unit for a period of time corresponding to the upper portion of the screen in a unit image being processed, and, otherwise, selects and outputs the video signal output from the delaying portion.

With such a structure, in this imaging apparatus, a unit image (for example, a field image or frame image) which is brightened due to effects of flash in a part of the screen (for example, a screen upper portion or a screen lower portion) can be detected, and the unit image can be corrected using the image area (for example, a screen upper portion or a screen lower portion) which is brightened due to effects of flash. As a result, effects of flash can be prevented from unnaturally appearing on video obtained by the imaging apparatus.

In this way, the imaging apparatus can eliminate an unnatural screen with a bright band caused by external flash and can obtain video (image) with secured continuity as a moving image while allowing to know whether flash enters the imaging apparatus or not. Furthermore, an original image of an image with flash being entered is shown clearer than in the third aspect.

The seventh aspect is the first or the second aspect in which the flash detection unit is operable to detect whether the video signal acquired by the imaging unit is affected by flash or not and to retain a detection result which is prior by one unit image time period, that is a time period corresponding to a unit image formed of a video signal.

The flash correction unit has a delaying portion and a selecting portion.

When the flash detection unit determines that the video signal corresponding to a lower portion of a screen of a unit image formed of a video signal which is prior by one unit image is affected by flash, the delaying portion does not receive the video signal output from the imaging unit for a period of time corresponding to the lower portion of the screen in the unit image being processed, and delays and outputs the video signal received from the imaging unit at a time which is prior by one unit image time period with a further delay of one image unit time period, and otherwise, delays and outputs the video signal from the imaging unit with a delay of one unit image time period. When the flash detection unit determines that the video signal corresponding to an upper portion of a screen of a unit image formed of a video signal is affected by flash, the selecting portion selects and outputs the video signal output from the imaging unit to output for a period of time corresponding to the upper portion of the screen in the unit image being processed, and, otherwise, selects and outputs the video signal output from the delaying portion.

With such a structure, in this imaging apparatus, a unit image (for example, a field image or frame image) which is brightened due to effects of flash in a part of the screen (for example, a screen upper portion or a screen lower portion) can be detected, and the unit image can be corrected using the image area (for example, a screen upper portion or a screen lower portion) which is brightened due to effects of flash. As a result, effects of flash can be prevented from unnaturally appearing on video obtained by the imaging apparatus.

In this way, the imaging apparatus can eliminate an unnatural screen with a bright band caused by external flash and can obtain video (image) with secured continuity as a moving image while allowing to know whether flash enters the imaging apparatus or not. The scale of circuit is smaller than that of the sixth aspect, and power consumption in processing images affected by flash is also smaller.

The wordings "a period of time corresponding to a lower (upper) portion of the screen in the unit image being processed" refers to a time (period) during which a video signal which forms the lower portion (upper portion) of a screen of a field image is being processed in a field image currently being processed by the imaging apparatus when the "unit image" is a "field image", for example.

The eighth aspect is the first or second aspect in which the flash detection unit is operable to detect whether the video signal acquired by the imaging unit is affected by flash or not and retains a detection result which is prior by one unit image time period, that is a time period corresponding to a unit image formed of a video signal.

The flash correction unit has a first selecting portion, a delaying portion, an adding portion, a mixing portion, and an output selecting portion.

The first selecting portion is operable to receive a plurality of video signals as inputs and to select and output one of video signals from the input plurality of video signals based on a detection result at the flash detection unit. The delaying portion is operable to output a first delay signal obtained by delaying the video signal output from the first selecting portion by one unit image time period and a second delay signal obtained by delaying the first delay signal by one unit image time period. The adding portion is operable to treat the video signal output from the imaging unit and the first delay signal output from the delaying portion with an adding process and to output the video signals treated with the process. The mixing portion is operable to mix the video signal output from the adding portion and the second delay signal at a predetermined ratio and to output. The output selecting portion is operable to select and output either the video signal output from the mixing portion or the first delay signal output from the delaying portion.

The first selecting portion is operable to receive the video signal output from the imaging unit and the video signal output from the adding portion as inputs, and, when the flash detection unit determines that the video signal output from the imaging unit is not affected by flash, to select and output the video signal output from the imaging unit, and, when the flash detection unit determines that the video signal output from the imaging unit is affected by flash, to select and output the video signal output from the mixing portion. The output selecting portion is operable to select and output the first delay signal output from the delaying portion when the flash detection unit determines that the video signal output from the imaging unit is not affected by flash, and, when the flash detection unit determines that the video signal output from the imaging unit is affected by flash, to select and output the video signal output from the mixing portion.

With such a structure, in this imaging apparatus, a unit image (for example, a field image or frame image) which is brightened due to effects of flash in a part of the screen (for example, a screen upper portion or a screen lower portion) can be detected, and the unit image can be corrected using the image area (for example, a screen upper portion or a screen lower portion) which is brightened due to effects of flash. As a result, effects of flash can be prevented from unnaturally appearing on video obtained by the imaging apparatus.

In this way, the imaging apparatus can eliminate an unnatural screen with a bright band caused by external flash and can obtain video (image) with secured continuity as a moving image while allowing to know whether flash enters the imaging apparatus or not. Furthermore, in this imaging apparatus, flash correction is performed based on an image (video) generated by using more unit images by the mixing portion. Thus, non-continuity in motion can be mitigated than in the third aspect.

The ninth aspect is the eighth aspect in which the delaying portion is operable to output the second delay signal only when the flash detection unit determines that the video signal output from the imaging unit is affected by flash.

In this imaging apparatus, the second delay signal is output by the delaying portion only when necessary. Thus, power consumption in processing images affected by flash is smaller than in the eighth aspect.

The tenth aspect is any one of first through ninth aspect in which the unit image is a field image, and the unit image time period is a field time period.

In this way, a flash correcting process in field units can be performed.

The eleventh aspect is any one of first through tenth aspect in which the flash detection unit is operable to detect whether the video signal acquired by the imaging unit is affected by flash or not in either pixel units, line units, or field units.

Further, flash detection unit performs generating signals as follows:

(1) generating a first flash determination signal which outputs a value indicating effects of flash only for a time period corresponding to a screen area which is affected by flash in a screen of a image formed of the video signal;

(2) generating a second flash determination signal which outputs a value indicating effects of flash only for a time period corresponding to the entire screen when it is determined that there are effects of flash at a start time of the screen of the image formed of the video signal; and (3) generating a third flash determination signal which outputs a value indicating effects of flash only for a time period corresponding to the entire screen when it is determined that there are effects of flash only in a lower portion of the screen of the image formed of the video signal.

The flash detection unit can delay the first flash determination signal, the second flash determination signal, and the third flash determination signal, respectively, for a predetermined time period, and can output one or a plurality of the flash determination signal, the second flash determination signal, and the third flash determination signal and signals obtained by delaying the first flash determination signal, the second flash determination signal, and the third flash determination signal by a predetermined period.

With such a structure, a signal indicating which unit image is affected by flash and a signal indicating which area on a screen in an image formed of a video signal is affected by flash can be generated. In the imaging apparatus, a flash correcting process can be performed appropriately using these signals.

The twelfth aspect is any one of first through ninth aspect in which the adding portion and the selecting portion are operable to add and select signals after matching phases in a vertical direction by shifting one of video signals by 0.5 lines when vertical phases of the two video signals input to the adding portion and the selecting portion are shifted from each other by 0.5 lines.

In this imaging apparatus, when vertical phases of the two video signals input to the adding portion and the selecting portion are shifted from each other by 0.5 lines, one of the video signals is shifted by 0.5 lines to match the phases in the vertical direction before adding and selecting. Thus, phases of signals in the vertical direction are not shifted by processes.

Accordingly, video signals in the interlace format can be treated appropriately with the detection correcting process.

The thirteenth aspect is the imaging method used for an imaging apparatus comprising an imaging unit which has an imaging element and is operable to convert an optical signal incident from an object into an electrical signal to acquire and output a video signal, the imaging method comprising the steps of flash detecting, and flash correcting.

In the flash detecting, whether the video signal acquired by the imaging unit is affected by flash or not is detected. In the flash correcting, the video signal output from the imaging unit is corrected using the video signal determined to be affected by flash when the video signal acquired by the imaging unit is determined to be affected by flash at the step of flash detecting.

In this way, an imaging method having similar effects as the first aspect can be achieved.

The fourteenth aspect is a program for having a computer to perform an imaging method used for an imaging apparatus comprising an imaging unit which has an imaging element and is operable to convert an optical signal incident from an object into an electrical signal to acquire and output a video signal. The imaging method includes the steps of flash detecting and flash correcting.

In the flash detecting, whether the video signal acquired by the imaging unit is affected by flash or not is detected. In the flash correcting, the video signal output from the imaging unit is corrected using the video signal determined to be affected by flash when the video signal acquired by the imaging unit is determined to be affected by flash at the step of flash detecting.

In this way, a program for having a computer to perform an imaging method having similar effects as the first aspect can be achieved.

The fifteenth aspect is an integrated circuit used for an imaging apparatus comprising an imaging unit which has an imaging element and is operable to convert an optical signal incident from an object into an electrical signal to acquire and output a video signal, and the integrated circuit includes a flash detecting unit and a flash correcting unit.

The flash detecting unit is operable to detect whether the video signal acquired by the imaging unit is affected by flash or not. The flash correcting unit is operable to correct the video signal output from the imaging unit using the video signal determined to be affected by flash when the video signal acquired by the imaging unit is determined to be affected by flash by the flash detecting unit.

In this way, an integrated circuit having similar effects as the first aspect can be achieved.

Advantageous Effects

According to the present invention, an imaging apparatus, an imaging method, a program, and an integrated circuit which can eliminate an unnatural screen with a bright band caused by external flash and which can obtain video (image) with secured continuity as a moving image while allowing to know whether flash enters or not can be achieved.

DESCRIPTION OF EMBODIMENTS

Hereinafter, embodiments are described with reference to the drawings.

First Embodiment

1.1: Structure of Imaging Apparatus

Figures 1, 2:
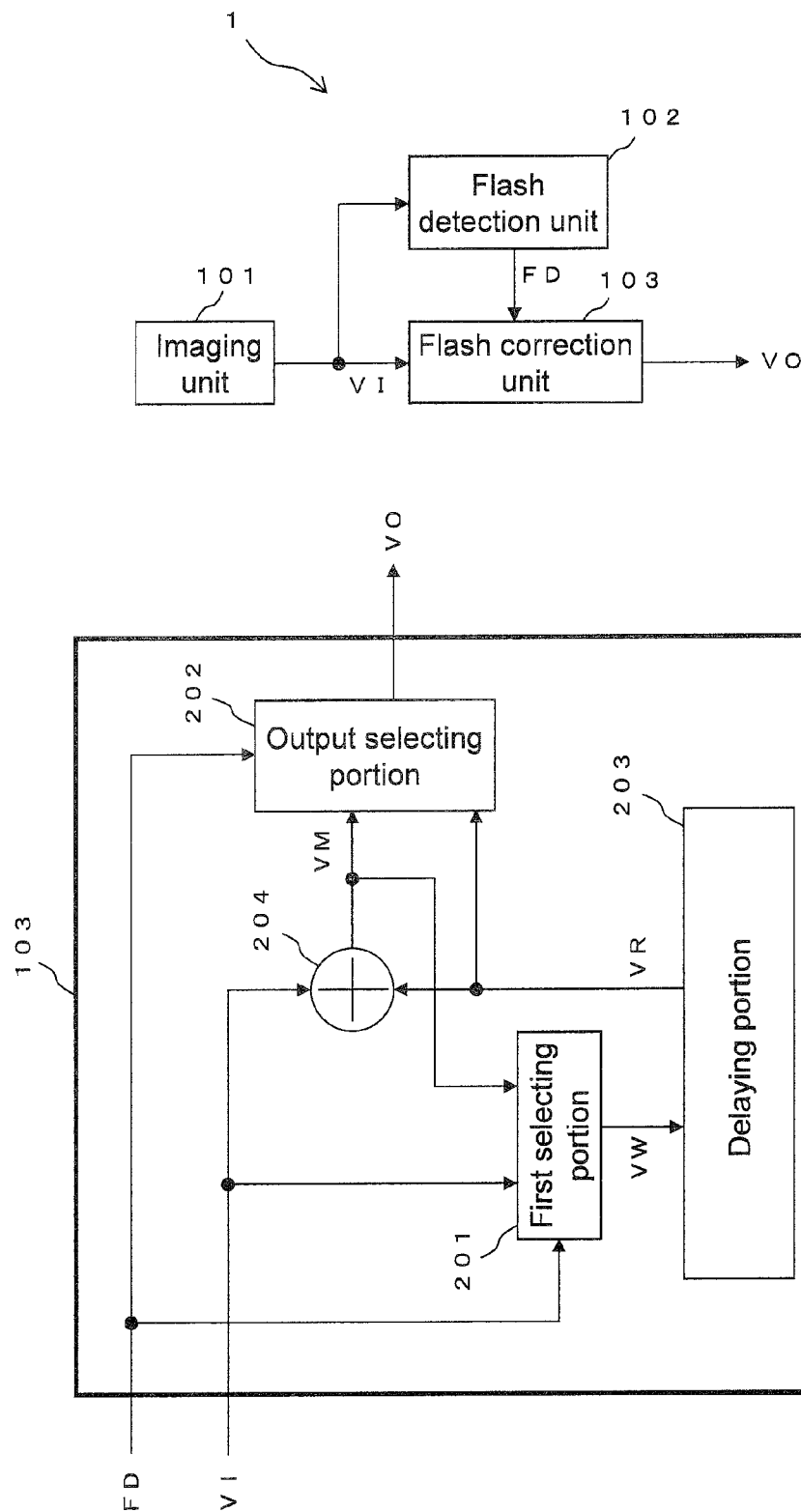
FIG. 1 is a block diagram of an imaging apparatus 1 of the first embodiment.
FIG. 2 is a block diagram of an flash correction unit 103 of the first embodiment.

FIG. 1 is a block diagram (schematic diagram) of an imaging apparatus 1 according to the first embodiment.

For the sake of convenience in descriptions, hereinafter, a process in field units is described.

As shown in FIG. 1, the imaging apparatus 1 includes an imaging unit 101 which images an object and generates a video signal VI, a flash detection unit 102 which detects a presence of external flash from the video signal VI generated at the imaging unit 101 in the field units and generates a flash detection signal FD including information on the detected result, and a flash correction unit 103 which corrects the output video signal VI of the imaging unit 101 which is affected by external flash in accordance with the flash detection signal FD generated by the flash detection unit 102.

The imaging unit 101 includes, for example, a CMOS-type imaging element (CMOS-type image sensor or the like), condenses light from the object, and performs photo-electric conversion of the condensed light to acquire the video signal VI. The imaging unit 101 outputs the acquired video signal VI to the flash detection unit 102 and the flash correction unit 103.

The flash detection unit 102 receives the video signal VI output from the imaging unit 101 as an input, and detects a presence of external flash from the video signal VI generated at the imaging unit 101 in the field units. Specifically, it generates a flash detection signal FD, which becomes "1" when it is determined that the video signal VI corresponding to the start time of the field is affected by external flash (determined that the video signal VI of the first line of the field is affected by external flash) among fields formed of the video signal VI in the field period of the corresponding field, and otherwise, which becomes "0". The flash detection unit 102 outputs the generated flash detection signal FD to the flash correction unit 103.

The flash correction unit 103 receives the video signal VI output from the imaging unit 101 and the flash detection signal FD output from the flash detection unit 102 as inputs, and treats the video signal VI with a flash correcting process based on the flash detection signal FD to output a video signal VO treated with the flash correcting process.

As shown in FIG. 2, the flash correction unit 103 has a first selecting portion 201, an output selecting portion 202, a delaying portion 203, and an adding portion 204.

The first selecting portion 201 receives the video signal VI output from the imaging unit 101, a video signal VM output from the adding portion 204 and the flash detection signal FD output from the flash detection unit 102 as inputs, and selects either the video signal VI or the video signal VM to output to the delaying portion 203 as a video signal VW based on the flash detection signal FD.

Specifically, the first selecting portion 201 performs a selecting process and outputs the video signal VW as follows.

(1) When the flash detection signal FD is "0", the video signal VI output from the imaging unit 101 is selected and is output to the delaying portion 203 as the video signal VW.

(2) When the flash detection signal FD is "1", the video signal VM output from the adding portion 204 is selected and is output to the delaying portion 203 as the video signal VW.

The delaying portion 203 receives the video signal VW output from the first selecting portion 201 as an input, and outputs a video signal which is the video signal VW delayed by one field (delayed for a time period corresponding to one field period) to the adding portion 204 and the output selecting portion 202 as a video signal VR.

The adding portion 204 receives the video signal VI output from the imaging unit 101 and the video signal VR output from the delaying portion 203 as inputs, and generates the video signal VM which is obtained by adding the video signal VI and the video signal VR. The adding portion 204 outputs the video signal VM to the output selecting portion 202.

The output selecting portion 202 receives the video signal VR output from the delaying portion 203, the video signal VM output from the adding portion 204, and the flash detection signal FD output from the flash detection unit 102 as inputs, and selects either the video signal VR or the video signal VM to output as the video signal VO based on the flash detection signal FD.

Specifically, the output selecting portion 202 performs a selecting process and outputs the video signal VO as follows.

(1) When the flash detection signal FD is "0", the video signal VR output from the delaying portion 203 is selected and is output as the video signal VO.

(2) When the flash detection signal FD is "1", the video signal VM output from the adding portion 204 is selected and output as the video signal VO.

1.2: Operations of Imaging Apparatus

Operations of the imaging apparatus 1 having a structure as described above are described with reference to FIG. 3.

Figure 3:
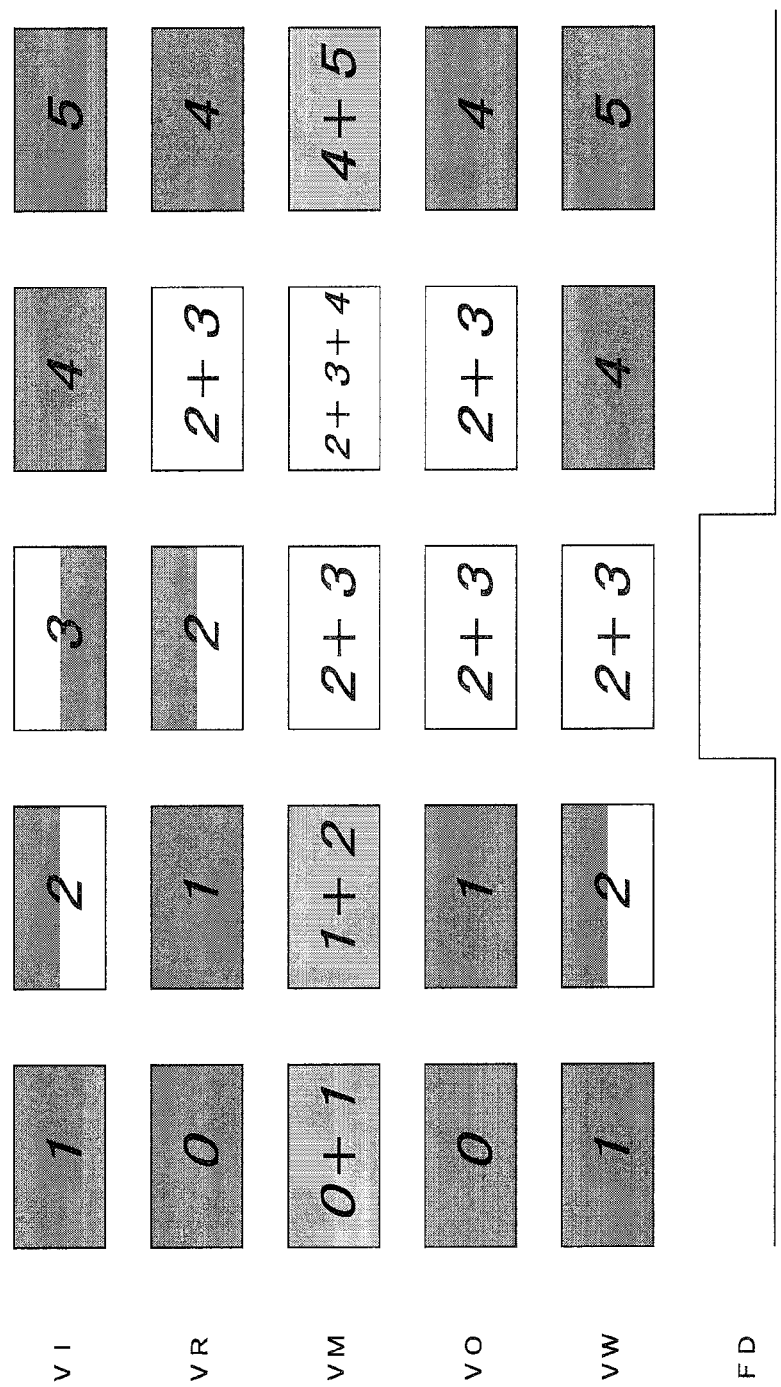
FIG. 3 is a diagram showing video at each part in the first embodiment.
Figure 17:
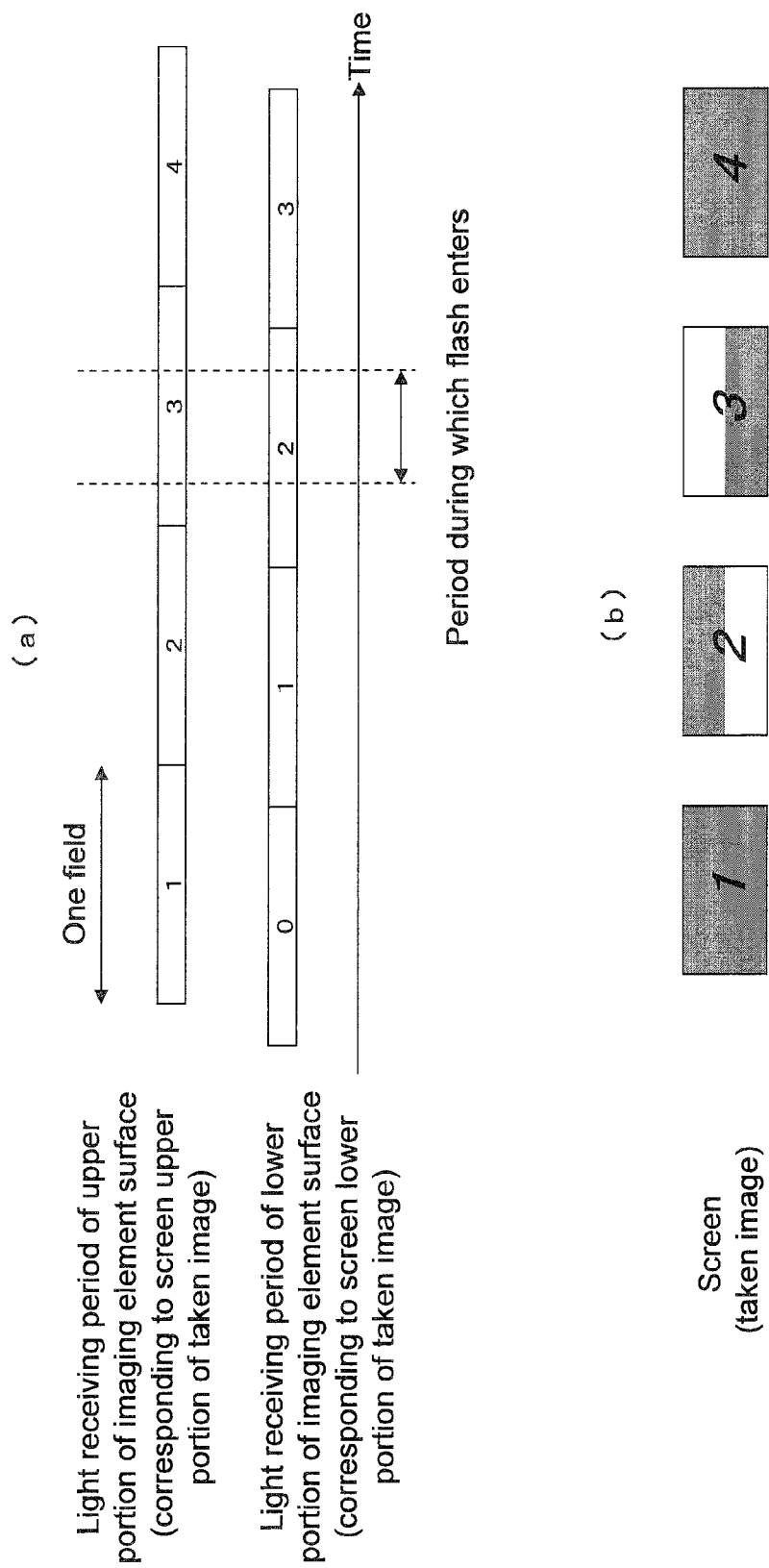
FIG. 17 is a diagram showing an example of flash entering when a CMOS-type imaging element is used.

FIG. 3 is a diagram showing relationships among the video signals VI, VR, VM, VO and VW, and the flash detection signal FD in the case where flash impinges upon the imaging apparatus 1 at a timing as shown in FIG. 17, with the time axis being matched to each other. FIG. 3 schematically shows how images (video) formed of video signals VI, VR, VM, VO and VW, respectively, are affected by flash.

The numbers shown in Italic characters (bold characters) in FIG. 3 denote the numbers of fields of the input video (signals) (the same is also true of the following descriptions).

First, in the imaging unit 101, an optical image (light from an object) which enters the CMOS-type imaging element through a lens included in the imaging unit 101 is converted into an electrical signal. The electrical signal is treated with an A/D conversion, and further with processes such as white balance or the like. The generated (acquired) signal is output as video signal VI from the imaging unit 101 to the flash detection unit 102 and the flash correction unit 103 as the video signal VI.

When flash enters the video (the video formed of the video signal VI) at a timing as shown in FIG. 17, the video (field images) becomes the one denoted by VI in FIG. 3. Specifically, when the flash enters, an upper portion of "screen 2" (field 2) (hereinafter, "field N" (N: integer) may be referred to as "screen N") has already been output as a video signal (stored charges (charges stored on a pixel of CMOS-type imaging element of the imaging unit 101) for generating the video signal which form video (image) of a part corresponding to the upper portion of "screen 2" has already been read out from the CMOS-type imaging element of the imaging unit 101). Thus, it is not affected by the flash, and normal video is obtained. On the other hand, the lower portion of "screen 2" becomes bright due to the flash, and the video shown as "screen 2" (field 2) of VI in FIG. 3 is obtained. This is because stored charges (charges stored on a pixel of CMOS-type imaging element of the imaging unit 101) for generating the video signal which form video (image) of a part corresponding to the lower portion of "screen 2" are read out from the CMOS-type imaging element of the imaging unit 101 after the flash. At "screen 3" (field 3), video of the upper portion of the screen is generated while the flash is entering (stored charges (charges stored on a pixel of CMOS-type imaging element of the imaging unit 101) for generating the video signal which form video (image) of a part corresponding to the upper portion of "screen 3" are read out from the CMOS-type imaging element of the imaging unit 101 after the flash). Thus, the screen upper portion of "screen 3" becomes bright video. When the video of the screen lower portion of "screen 3" is generated, the screen lower portion of "screen 3" is not affected by flash and become normal video since there is no more flash.

Based on such a video signal VI, the flash detection unit 102 generates the flash detection signal FD as shown in FIG. 3. Specifically, when the flash detection unit 102 determines that the head (first line) of the field image formed of the video signal VI has external flash (is affected by external flash), it outputs the flash detection signal FD with the signal value of "1" (H) during the corresponding field period. In other words, in the case as shown in FIG. 3, the flash detection unit 102 outputs the flash detection signal FD with the signal value of "1" (H) when the video signal VI is "screen 3", and outputs the flash detection signal FD with the signal value of "0" (L) in other fields. A method for detecting external flash itself is not described in details since it is not a main subject matter of the present invention.

(1.2.1: Operations of Flash Correction Unit 103)

Next, operations of the flash correction unit 103 when the video signal VI from "screen 1" through "screen 5" shown in FIG. 3 is input will be described. Herein, the video of the field prior to "screen 1" is referred to as "screen 0", and "screen 0" is not affected by external flash.

(At "Screen 1"):

When the video signal VI is at "screen 1", there is no external flash (no effects of external flash), and the value of the flash detection signal FD is "0". Thus, the first selecting portion 201 selects the video signal VI. Accordingly, as shown in FIG. 3, the video signal VW is the video signal of "screen 1", and is output to the delaying portion 203.

The delaying portion 203 outputs the video signal of a field which is prior by one field. Accordingly, as shown in FIG. 3, the video signal VR is a signal of "screen 0".

As the value of the flash detection signal FD is "0", the output selecting portion 202 selects the video signal VR. Accordingly, as shown in FIG. 3, the video signal VO, which is the output signal of the output selecting portion 202, is the video signal of screen "0".

(At "Screen 2"):

In the next field, "screen 2", i.e., video with the screen lower portion being brightened due to effects of flash as shown in FIG. 3, is input. At this point, the value of the flash detection signal FD is "0". Thus, operations are same as those when "screen 1" is input. As shown in FIG. 3, the video signal VR is the video signal of "screen 1". The video signal VO, which is the output of the output selecting portion 202 and is the output of the flash correcting unit 103, is the video signal of "screen 1". The video signal VW input to the delaying portion 203 for delaying by one field becomes the video signal of "screen 2".

(At "screen 3"):

Further, in the next field, "screen 3", i.e., the video with the screen upper portion of the being brightened due to effects of flash, as shown in FIG. 3, is input. At this point, the value of the flash detection signal FD is "1", and thus, operations differ from those when "screen 1" is input.

The delaying portion 203 outputs the video signal of "screen 2", which has been input to the delaying portion 203 at the prior field for delaying by one field, as the video signal VR with a delay of one field. The video signal of "screen 2" which is the video signal VR and the video signal of "screen 3" which is the video signal VI are added at the adding portion 204 to generate the video signal VM. As the value of the flash detection signal FD is "1", the video signal VM generated by adding the video signal of "screen 2" and the video signal of "screen 3" is selected by the output selecting portion 202, and becomes the output signal VO of the flash correction unit 103. Since the value of the flash detection signal FD is "1", the first selecting portion 201 selects the video signal VM generated by adding the video signal of "screen 2" and the video signal of "screen 3". In other words, the video signal VW input to the delaying portion 203 for delaying by one field is the video signal VM.

(At "Screen 4"):

In further next field, the video signal of "screen 4" as shown in FIG. 3 is input. At this point, the value of the flash detection signal FD is "0", and thus, operations are same as those when "screen 1" is input. Accordingly, as shown in FIG. 3, the video signal VR is the video signal VW at the prior field, i.e., the signal obtained by adding the video signal of "screen 2" and the video signal of "screen 3". For the video signal VO, which is the output of the output selecting portion 202 and also the output of the flash correcting unit 103, the signal obtained by adding the video signal of "screen 2" and the video signal of "screen 3, which is the video signal VR, is selected to be the video signal VO since the value of the flash detection signal FD is "0". The video signal VW output to the delaying portion 203 for delaying by one field is the video signal of "screen 4", which is the input video signal VI.

(At "Screen 5"):

Further next, when the signal of "screen 5" is input as the video signal VI, similarly, the video signal VR is the video signal of "screen 4" as shown in FIG. 3. The video signal VO is the video signal of "screen 4". The video signal VW is the video signal of "screen 5". Further, similar operations will be repeated for every field.

When a signal value of addition becomes too large, as a result of adding two video signals at the adding portion 204, the signal value after the addition may be replaced with the maximum value which can be represented by the input video signal. For example, when the input video signal is a digital signal of 10 bits, and the result of addition (the signal value after addition) is 1024 to 2046, it may be replaced with 1023.

With the above operations, in the imaging apparatus 1, the video signal with the screen lower portion being bright for "screen 2" or with the screen upper portion being bright for "screen 3" due to effects of flash as shown by the video signal VI in FIG. 3 can be video with entirely bright screen (video formed of the video signal obtained by adding the video signal of "screen 2" and the video signal of "screen 3") in a period corresponding to "screen 2" and "screen 3" of the video signal VI as shown by the output video signal VO of FIG. 3. The video which is entirely and evenly bright as an actual object can be generated. Further, as the imaging apparatus 1 uses video which is affected by flash, presence of flash remain on video signals.

When the video signal generated at the imaging unit 101 has an interlace format, the video signal VI is shifted in a vertical direction by 0.5 lines for correction so as to have the same vertical screen position with the video signal VR before adding the video signals at the adding portion 204. With such an operation, an amount of delay becomes different from as that described above. However, adjustment can be made by changing the timing to read out the video signal VR from the delaying portion 203.

In the present embodiment, the video signal VI is used as information for determining whether flash enters or not in the imaging apparatus 1. However, the present embodiment is not limited to such an example. For example, a dedicated sensor for detecting flash itself may be provided on the imaging apparatus 1, and the imaging apparatus 1 may generate the flash detection signal FD based on the signal obtained from the sensor.

<<First Variation>>

Next, the first variation of the present embodiment is described.

Figure 4:
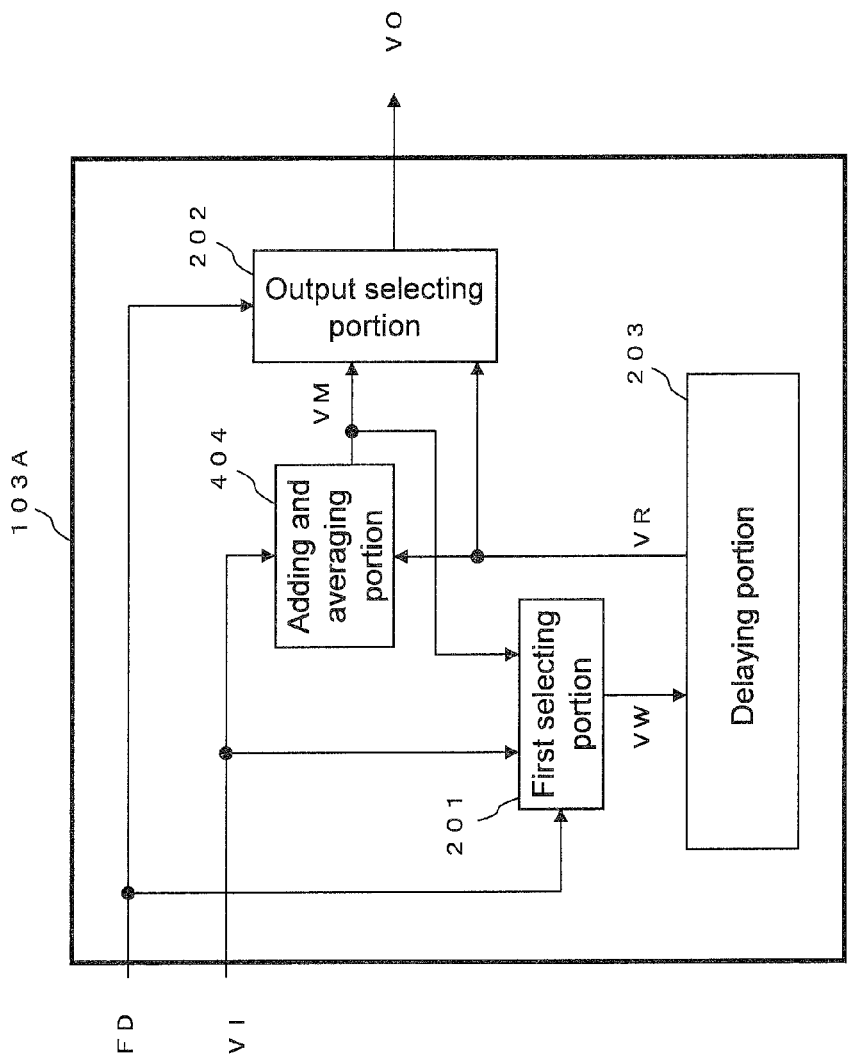
FIG. 4 is a block diagram of an flash correction unit 103A of the first variation of the first embodiment.

The imaging apparatus of the present variation has a structure in which the flash correction unit 103 in the imaging apparatus 1 is replaced with a flash correction unit 103A shown in FIG. 4. The flash correction unit 103A has a structure in which the adding portion 204 in the flash correction unit 103 (see FIG. 2) is replaced with an adding and averaging portion 404 as shown in FIG. 4. Beside that, the flash correction unit 103A is similar to the flash correction unit 103.

Figure 5:
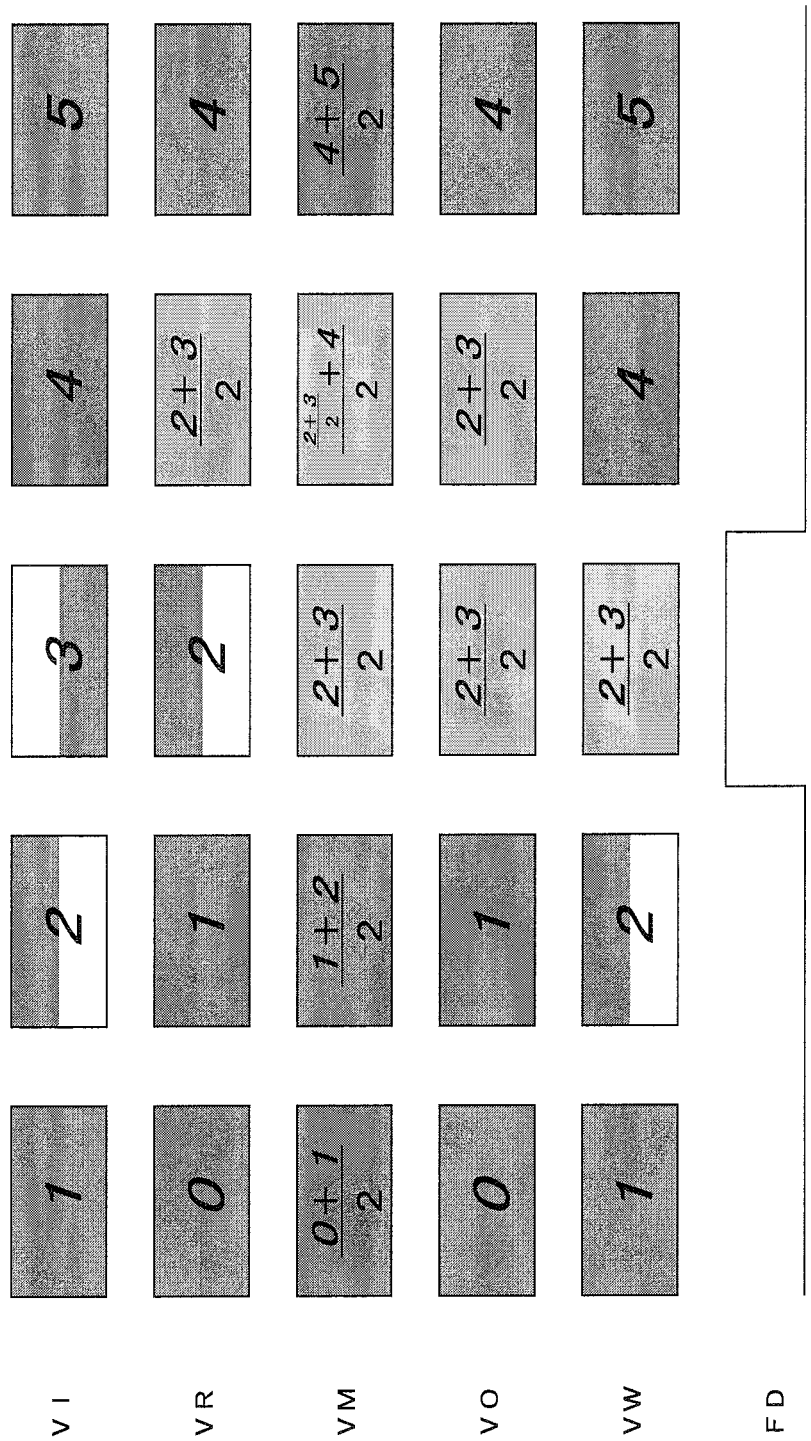
FIG. 5 is a diagram showing video at each part in the first variation of the first embodiment.

In the imaging apparatus with the flash correction unit 103 being replaced with the flash correction unit 103A shown in FIG. 4, the signals, with which "screen 2" and "screen 3" shown in FIG. 3 are replaced with screens formed of video signals obtained by adding the video signal of "screen 2" and the video signal of "screen 3" (denoted as "2+3" in FIG. 3), are those with which, screens formed of video signals obtained by adding and averaging the video signal of "screen 2" and the video signal "screen 3" (denoted as "(2+3)/2" in FIG. 5) as shown in FIG. 5. In this way, with such an imaging apparatus, video with entirely and evenly bright screen can be obtained as in the case where addition is performed, and unlikely to the case where addition is performed, there is no such case that it is hard to know what is taken from the information about video of a part which is not affected by flash because of too strong flash (effects of too strong flash can be suppressed). Instead, this imaging apparatus suppresses an effect of flash to brighten. Accordingly, instead of the adding and averaging process which halves the video signals acquired by addition, this imaging apparatus may perform the adding and averaging process by multiplying the video signal acquired by addition by three fourths. In this way, effects of too strong flash can be suppressed efficiently in this imaging apparatus while the effect of flash to brighten is maintained. Further, it is needless to say that the numeric value by which the video signal acquired by addition may be any numeric value other than "¾" in the above example.

<<Second Variation>>

Next, the second variation of the present embodiment is described.

Figure 6:
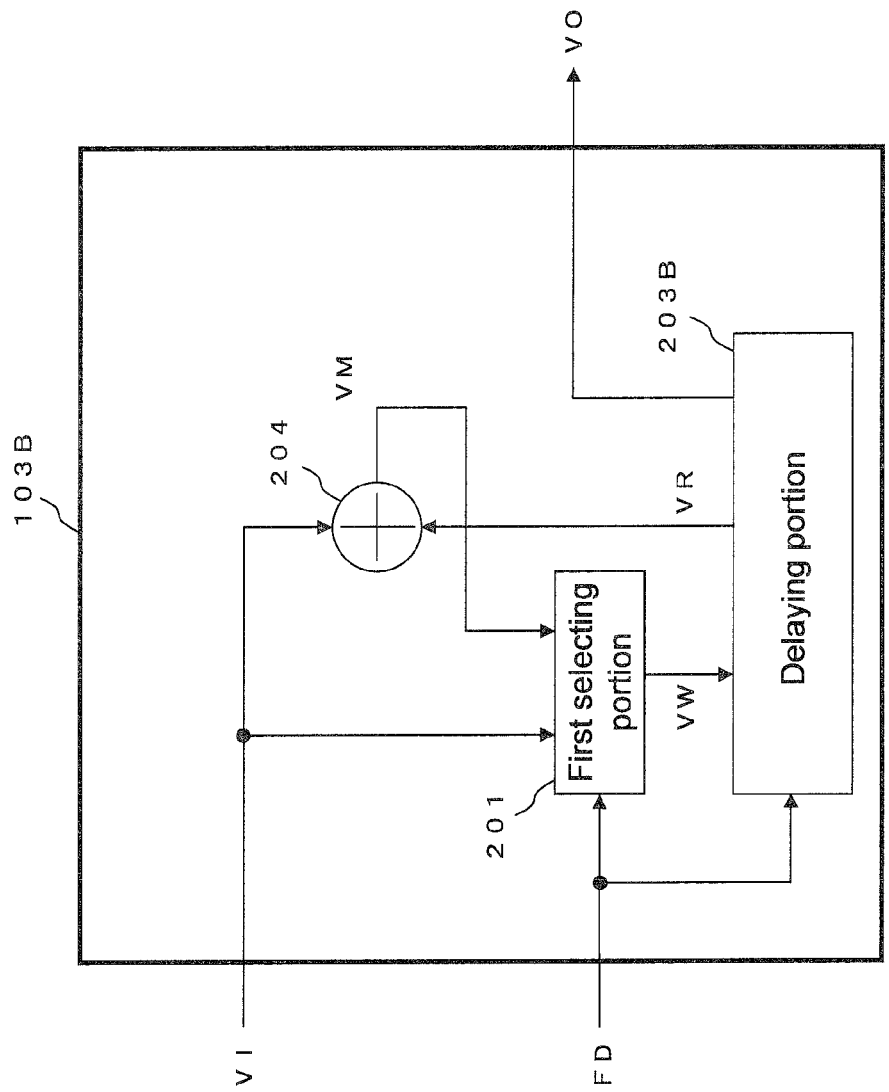
FIG. 6 is a block diagram of an flash correction unit 103B of the second variation of the first embodiment.

The imaging apparatus of the present variation has a structure in which the flash correction unit 103 in the imaging apparatus 1 is replaced with the flash correction unit 103B shown in FIG. 6. Hereinafter, components similar to those above are denoted by the same reference signs, and detailed descriptions thereof are omitted.

As shown in FIG. 6, the flash correction unit 103B includes the first selecting portion 201, the adding portion 204, and a delaying portion 203B.

The first selecting portion 201 receives the video signal VI, the video signal VM which is output from the adding portion 204 and the flash detection signal FD as inputs. The first selecting portion 201 selects either the video signal VI or the video signal VM, and outputs the selected video signal to the delaying portion 203B as the video signal VW based on the flash detection signal FD.

The adding portion 204 receives the video signal VI and the video signal VR which is output from the delaying portion 203B as inputs. The adding portion 204 outputs the video signal VM which is obtained by adding the video signal VI and the video signal VR to the first selecting portion 201.

The delaying portion 203B receives the flash detection signal FD and the video signal VW which is output from the first selecting portion 201 as inputs. The delaying portion 203B outputs a video signal which is the video signal VW delayed by one field (delayed for a time period corresponding to one field period) to the adding portion 204 as the video signal VR. The delaying portion 203B also outputs video signal VO based on the flash detection signal FD. Specifically:

(1) when the flash detection signal FD is "0", the delaying portion 203B outputs the video signal same as the video signal VR as the video signal VO; and (2) when the flash detection signal FD is "1", the delaying portion 203B outputs the video signal same as the video signal VR which is prior by one field as the video signal VO. In other words, when the field currently being processed is the Nth field (N is natural number), the delaying portion 203B outputs the video signal VR of the (N−1)th field.

Figure 7:
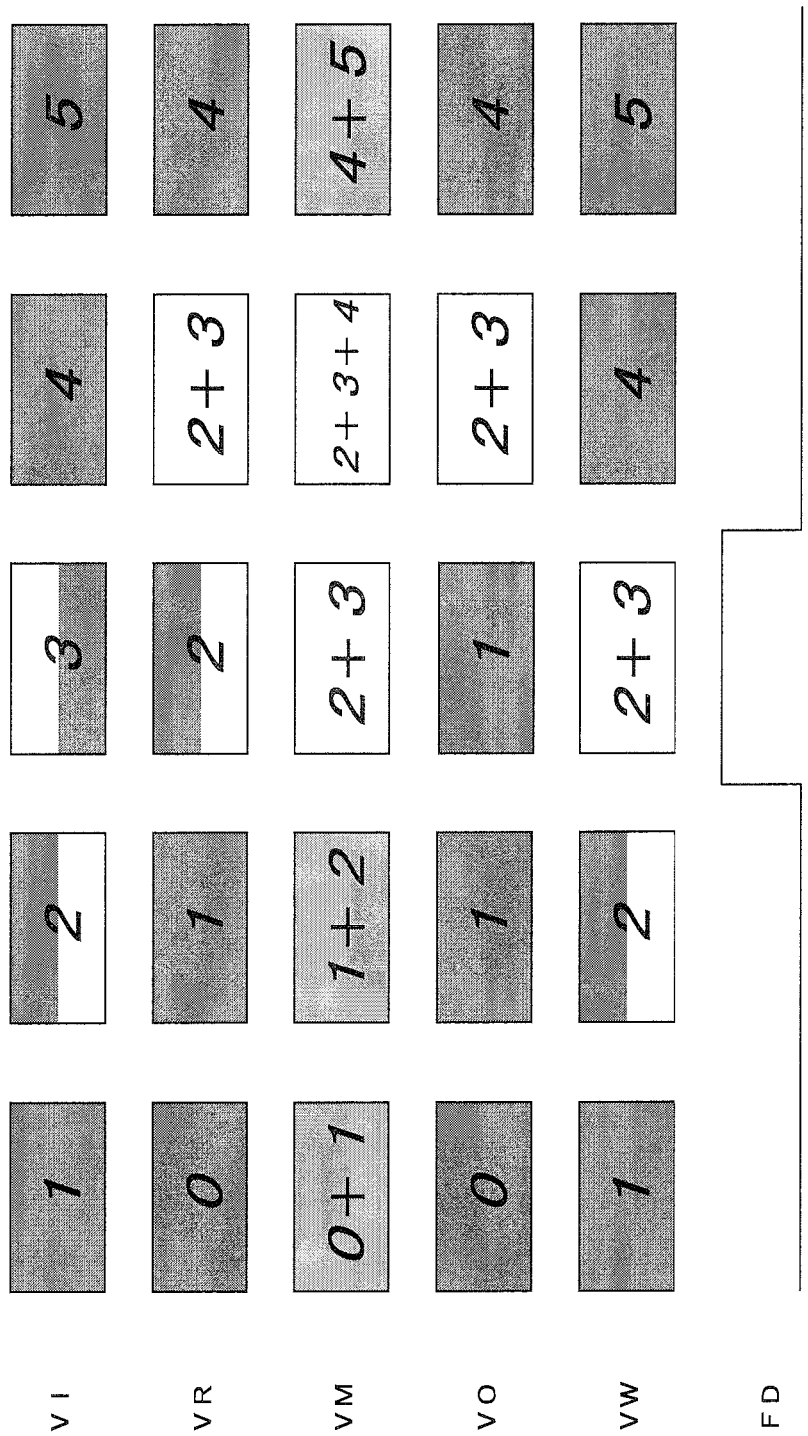
FIG. 7 is a diagram showing video at each part in the second variation of the first embodiment.

FIG. 7 is a diagram showing relationships among the video signals VI, VR, VM, VO and VW, and the flash detection signal FD in the case where flash impinges upon the imaging apparatus according to the present variation at a timing as shown in FIG. 17, with the time axis being matched to each other.

As shown in FIG. 7, the imaging apparatus according to the present variation is different from the example shown in FIG. 3 on the following points.

In the example shown in FIG. 3, at screen "3", the video signal VO is the video signal obtained by adding the video signal of "screen 2" and the video signal of "screen 3" (denoted as "2+3" in FIG. 3).

On the other hand, in the example shown in FIG. 7, the video signal VO at "screen 3" is the video signal of "screen 1" (denoted as "1" in FIG. 7).

In other words, in the imaging apparatus of the present variation, as the flash detection signal FD is "1" at "screen 3", the video signal which is prior by one field (denoted as "1" in FIG. 7) (the video signal VO (VR) at "screen 2") is output as the video signal VO.

<<Third Variation>>

Next, the third variation of the present embodiment is described.

Figure 8:
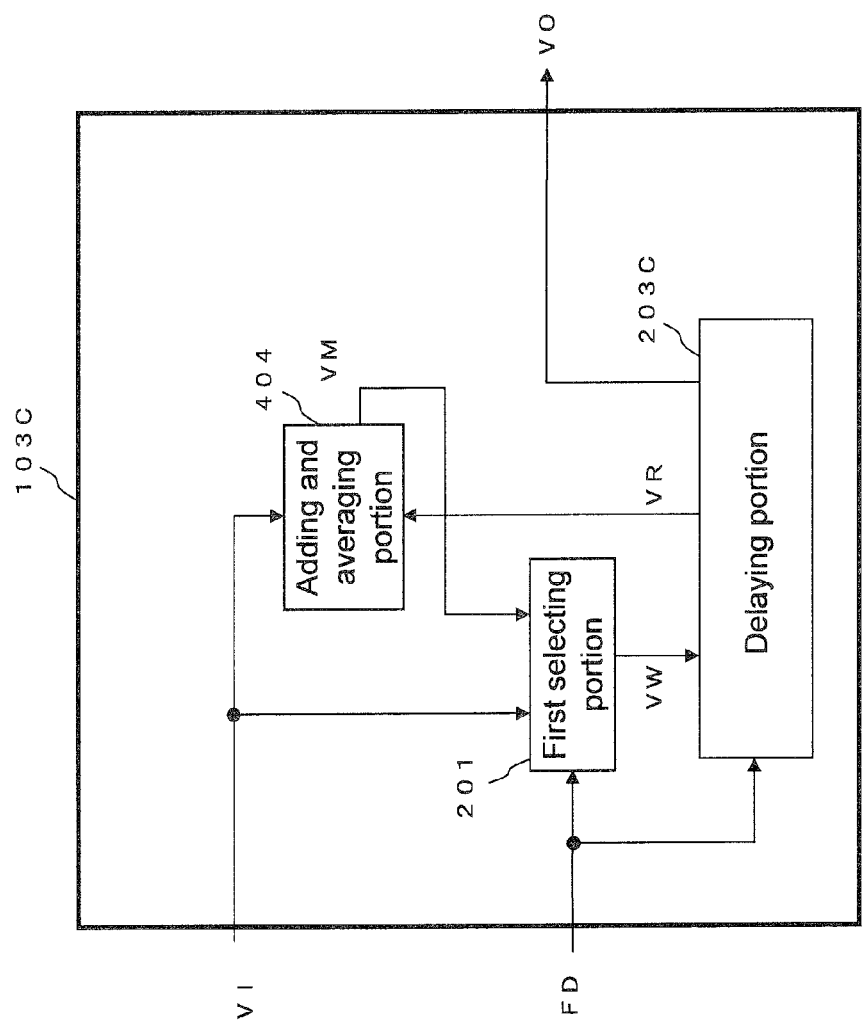
FIG. 8 is a block diagram of an flash correction unit 103C of the third variation of the first embodiment.

The imaging apparatus of the present variation has a structure in which the flash correction unit 103 in the imaging apparatus 1 is replaced with a flash correction unit 103C shown in FIG. 8. Hereinafter, components similar to those above are denoted by the same reference signs, and detailed descriptions thereof are omitted.

As shown in FIG. 8, the flash correction unit 103C has a structure in which the output selecting portion 202 is omitted from the flash correction unit 103 shown in FIG. 2 and the delaying portion 203 is replaced with a delaying portion 203C. Beside those points, the flash correction unit 103C is similar to the flash correction unit 103.

The delaying portion 203C receives the flash detection signal FD and the video signal VW which is output from the first selecting portion 201 as inputs. The delaying portion 203C outputs a video signal which is the video signal VW delayed by one field (delayed for a time period corresponding to one field period) to the adding and averaging portion 404 as the video signal VR. The delaying portion 203C also outputs video signal VO based on the flash detection signal FD. Specifically:

(1) when the flash detection signal FD is "0", the delaying portion 203C outputs the video signal same as the video signal VR as the video signal VO; and (2) when the flash detection signal FD is "1", the delaying portion 203C outputs the video signal same as the video signal VR which is prior by one field as the video signal VO. In other words, when the field currently being processed is the Nth field (N is natural number), the delaying portion 203C outputs the video signal VR of the (N−1)th field.

Figure 9:
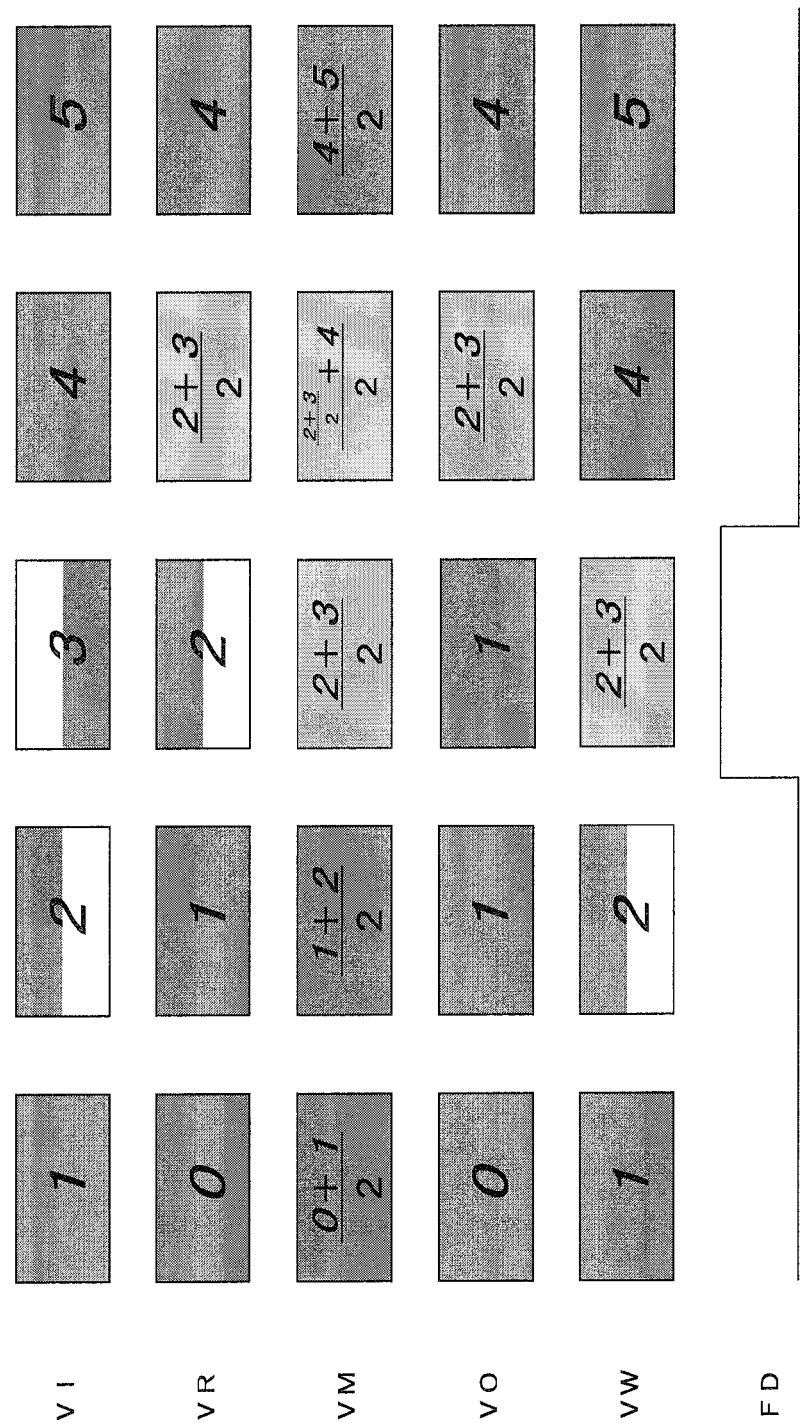
FIG. 9 is a diagram showing video at each part in the third variation of the first embodiment.

FIG. 9 is a diagram showing relationships among the video signals VI, VR, VM, VO and VW, and the flash detection signal FD in the case where flash impinges upon the imaging apparatus according to the present variation at a timing as shown in FIG. 17, with the time axis being matched to each other.

As shown in FIG. 9, the imaging apparatus according to the present variation is different from the example shown in FIG. 5 on the following points.

In the example shown in FIG. 5, at screen "3", the video signal VO is the video signal obtained by adding and averaging the video signal of "screen 2" and the video signal of "screen 3" (denoted as "(2+3)/2" in FIG. 5).

On the other hand, in the example shown in FIG. 9, the video signal VO is the video signal of "screen 1" (denoted as "1" in FIG. 9) at "screen 3".

In other words, in the imaging apparatus of the present variation, as the flash detection signal FD is "1" at "screen 3", the video signal which is prior by one field (denoted as "1" in FIG. 9) (the video signal VO (VR) at "screen 2") is output as the video signal VO.

Second Embodiment

In the present embodiment, flows of the signals are almost same as those in the first embodiment, and mainly, the structure and the operations of the flash correction unit 103 are different. Hereinafter, those different parts will be mainly described.

<2.1: Structure of Imaging Apparatus>

Figure 10:
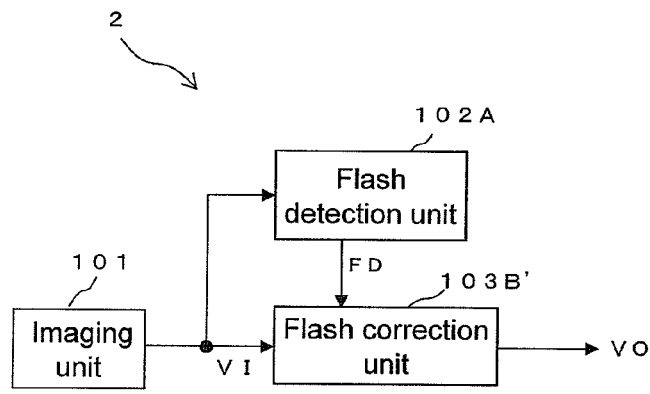
FIG. 10 is a block diagram of an imaging apparatus 2 of the second embodiment.

As shown in FIG. 10, an imaging apparatus 2 of the present embodiment is the imaging apparatus 1 of the first embodiment with the flash detection unit 102 being replaced with a flash detection unit 102A and the flash correction unit 103 being replaced with a flash correction unit 103B'. Beside those points, the imaging apparatus of the present embodiment is similar to the imaging apparatus 1 of the first embodiment.

In the present embodiment, components similar to those in the above embodiment are denoted by the same reference signs, and detailed descriptions thereof are omitted.

The flash detection unit 102A receives the video signal VI output from the imaging unit 101 as an input, and generates a flash detection signal FD from the video signal VI to output to the flash correction unit 103B'. The flash detection signal FD is a signal of two bits formed of an upper order bit FDO and a lower order bit FDW.

Specifically, the flash detection unit 102A generates and outputs the flash detection signal FD as follows.

(1) When the flash detection unit 102A determines that only an upper portion of the screen is affected by flash on screens of field images (a screen upper portion is affected by flash), the flash detection unit 102A turns the value of the upper order bit FDO of the flash detection signal into "1", and otherwise, it turns the value of the upper order bit FDO of the flash detection signal into "0" to output to the flash correction unit 103B'.

(2) When the flash detection unit 102A determines that only a lower portion of the screen is affected by flash on a screen for a field image which is prior by one field (a screen lower portion is affected by flash), the flash detection unit 102A turns the value of the lower order bit FDW of the flash detection signal into "1", and otherwise, it turns the value of the lower order bit FDW of the flash detection signal into "0" to output to the flash correction unit 103B'.

Figure 11:
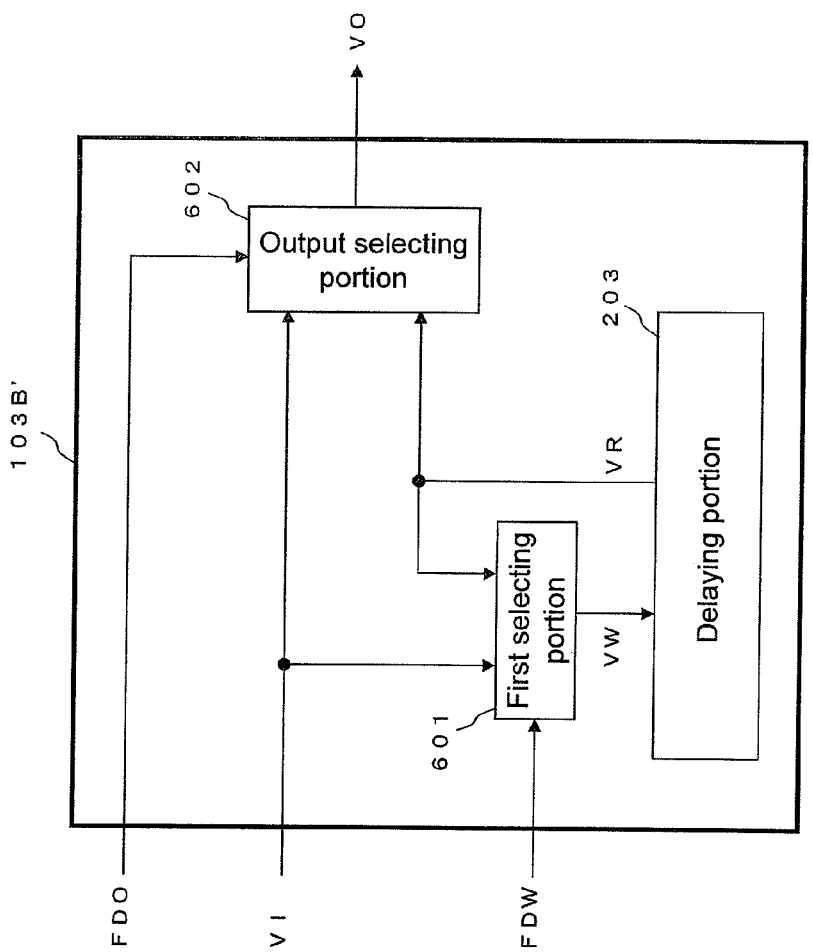
FIG. 11 is a block diagram of an flash correction unit 103B' of the second embodiment.

As shown in FIG. 11, the flash correction unit 103B' includes a first selecting portion 601, an output selecting portion 602, and the delaying portion 203.

The first selecting portion 601 selects the video signal VI output from the imaging unit 101 when the lower order bit FDW of the flash detection signal is "0", and selects the video signal VR output from the delaying portion 203 when the lower order bit FDW of the flash detection signal is "1" to generate the video signal VW and output thereof to the delaying portion 203.

The delaying portion 203 generates the video signal VR by delaying the video signal VW output from the first selecting portion 601 by one field and outputs to the first selecting portion 601 and the output selecting portion 602.

The output selecting portion 602 selects the video signal VR output from the delaying portion 203 when the upper order bit FDO of the flash detection signal is "0", and selects the video signal VI output from the imaging unit 101 when the upper order bit FDO of the flash detection signal is "1" to output as the video signal VO.

<2.2: Operations of Imaging Apparatus>

Operations of the imaging apparatus 2 having the structure as described above are described with reference to FIG. 13. The video of the field prior to "screen 1" of FIG. 13 is referred to as "screen 0", and "screen 0" is not affected by external flash.

Figure 13:
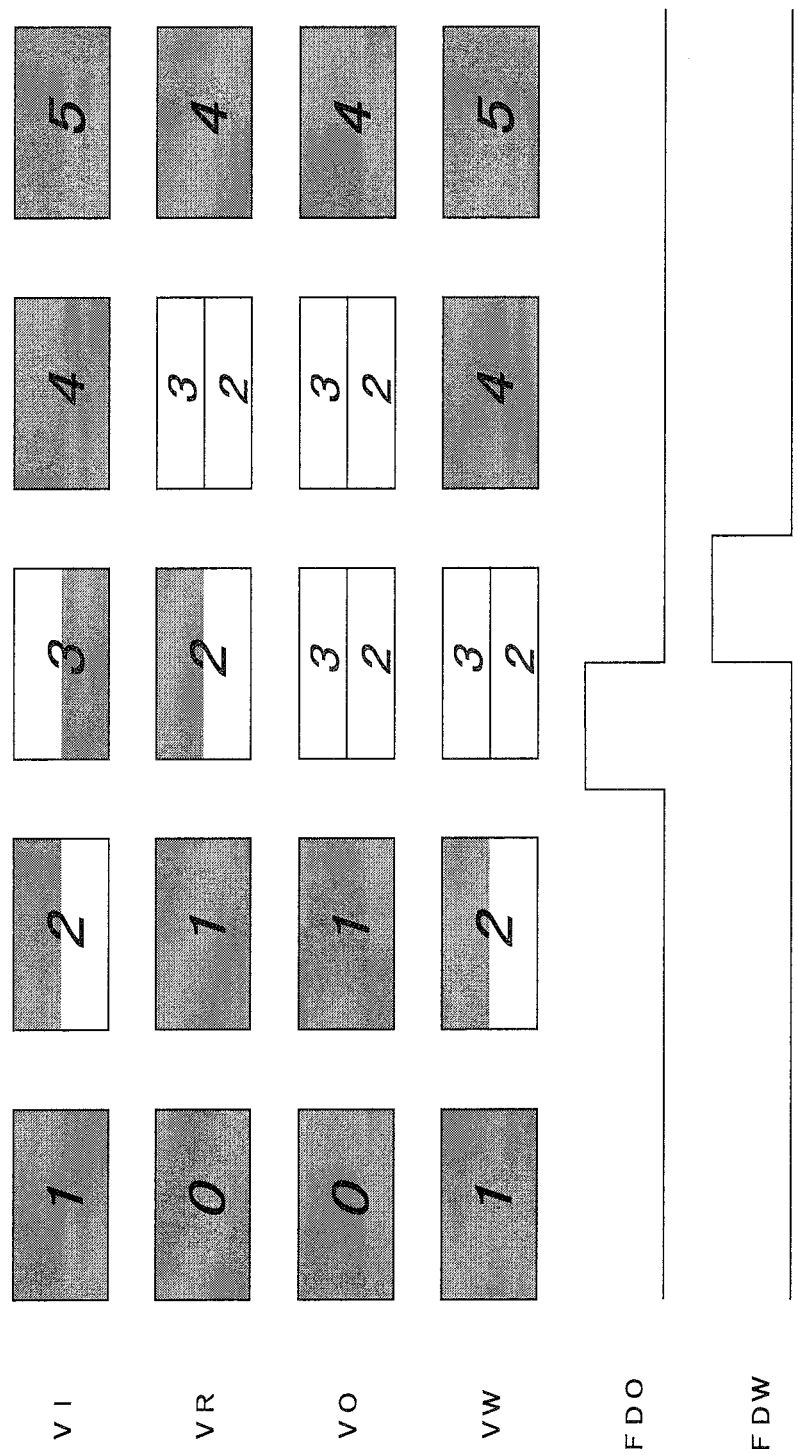
FIG. 13 is a diagram showing video at each part in the second embodiment.

As shown in FIG. 13, with the video signal output from the imaging unit 101, a lower portion of the screen is brightened due to effects of flash at "screen 2" and an upper portion of the screen is brightened due to effects of flash at "screen 3".

As shown in FIG. 13, the flash detection unit 102A generates flash detection signal FDO which becomes "1" when it is determined that only the upper portion of the screen is affected by flash (a signal of upper one bit of the flash detection signal FD), and flash detection signal FDW which becomes "1" when it is determined that only a lower portion of the screen is affected by flash in the prior field (a signal of lower one bit of the flash detection signal FD) for the video signals of "screen 2" and "screen 3" which are affected by flash.

In the example shown in FIG. 13, the flash detection unit 102A determines that flash is still entering at the last of "screen 2" (the video signal which form the last line of "screen 2") (there is effects of flash), and, when the next vertical blanking period starts, it turns the value of the flash detection signal FDO into "1" and outputs the signal. The flash detection unit 102A continues monitoring the video signal VI, and turns the value of the flash detection signal FDO into "0" in the middle of "screen 3", where it is determined that there is no longer an increase in brightness due to flash (effects of flash).

The flash detection unit 102A also remembers the line where flash began to enter, turns the value of the flash detection signal FDW into "1" at the remembered line in the next field, and further turns the value of the flash detection signal FDW into "0" when the next vertical blanking period starts.

(2.2.1: Operations of Flash Correction Unit 103B')

Next, operations of the flash correction unit 103B' when the video signal VI from "screen 1" through "screen 5" of FIG. 13 is input will be described.

(At "Screen 1"):

When the video signal VI input into the flash correction unit 103B' is at "screen 1", the value of the flash detection signal FDW is "0". Thus, the first selecting portion 601 selects the video signal VI. Accordingly, the video signal VW is the video signal of "screen 1", and is output to the delaying portion 203.

The delaying portion 203 outputs the video signal VR which is delayed by one field. Accordingly, the delaying portion 203 outputs the signal of "screen 0", which is the video signal of the field which is one field prior, to the first selecting portion 601 and the output selecting portion 602.

As the value of the flash detection signal FDO is "0", the output selecting portion 602 selects the video signal VR output from the delaying portion 203. Accordingly, as shown in FIG. 13, the video signal VO, which is the output signal of the output selecting portion 602, is the video signal of screen "0".

(At "Screen 2"):

In the next field, "screen 2", i.e., video with the lower half of the screen being brightened due to effects of flash as shown in FIG. 13 is input. At this point, both the flash detection signals FDW and FDO are "0". Thus, operations are same as those when "screen 1" is input. As shown in FIG. 13, the video signal VR is the video signal of "screen 1". The video signal VO, which is the output of the output selecting portion 602 and is also the output of the flash correcting unit 103B', is the video signal of "screen 1". The video signal VW input to the delaying portion 203 for delaying by one field is the video signal of "screen 2".

(At "screen 3"):

Further, in the next field, "screen 3", i.e., the video which has the screen upper portion being brightened due to effects of flash as shown in FIG. 13, is input. In this field, there are a period during which the value of the flash detection signal FDW is "1" and a period during which the value of the flash detection signal FDO is "1". Thus, operations are different from those when "screen 1" is input.

The delaying portion 203 outputs the video signal of "screen 2", which has been input to the delaying portion 203 at the prior field for delaying by one field, as the video signal VR with a delay of one field.

The output selecting portion 602 selects the video signal of "screen 3" which is the video signal VI when the value of the flash detection signal FDO is "1", and selects the video signal of "screen 2" which is the video signal VR when the value of the flash detection signal FDO is "0". As shown in FIG. 13, when the value of the flash detection signal FDO is "1", with the video signal of "screen 3" which is the video signal VI, the video is bright due to effects of flash. On the other hand, when the value of the flash detection signal FDO is "0", the video signal of "screen 2" which is the video signal VR is bright due to effects of flash. Accordingly, as shown by the video signal VO when the video signal VI is at "screen 3" in FIG. 13, the screen upper portion is "screen 3" and the lower portion is "screen 2", both being brightened due to effects of flash. Thus, the image has an entirely bright screen. Accordingly, the video signal which is an output from the output selecting portion 602, i.e., the output from the flash correcting unit 103B' is the video signal of the entirely bright screen.

(At "Screen 4"):

In further next field, the video signal of "screen 4" which is not affected by flash is input as shown in FIG. 13. At this point, the values of the flash detection signal FDW and FDO are "0", and operations are same as those when "screen 1" is input. Accordingly, as shown in FIG. 13, the video signal VR is the video signal of the entirely bright screen which is obtained by combining "screen 2" and "screen 3" and was the video signal VW at the prior field. The video signal is selected at the output selecting portion 602 and becomes the video signal VO which is also the output of the flash correcting unit 103B'. The video signal VW input to the delaying portion 203 for delaying by one field is the video signal of "screen 4" which is the input video signal VI.

(At "Screen 5"):

In further next field, similarly, when the signal of "screen 5" is input as the video signal VI, the video signal VR is the video signal of "screen 4" as shown in FIG. 13. The video signal VO is the video signal of "screen 4". The video signal VW is the video signal of "screen 5". Similar operations will be repeated for every field.

With the above operations, in the imaging apparatus 2 according to the present embodiment, by combining the video signal of "screen 2", which is the screen with the screen lower portion being bright due to effects of flash, and the video signal of "screen 3", which is the screen with the screen upper portion being bright due to effects of flash as in the video signal VI of FIG. 13, video can have an entirely bright screen in a period corresponding to "screen 2" and "screen 3", similarly to the video signal VO shown in FIG. 3. The entirely and evenly bright video as an actual object can be generated. Further, as the imaging apparatus 2 uses video which is affected by flash, presence flash can also remain on video signals. Furthermore, a scale of a circuit of the imaging apparatus 2 is smaller than that of the imaging apparatus 1 according to the first embodiment since there is no adding portion, and there is no overflow due to adding processes.

When the video signal generated at the imaging unit 101 has an interlace format, for selecting the video signal at the output selecting portion 602 of FIG. 11, the video signal VI is shifted in a vertical direction by 0.5 lines for correction so as to have the same vertical screen position with the video signal VR before selecting the video signals at the output selecting portion 602. With such an operation, an amount of delay becomes different from as that described above. However, adjustment can be made by changing the timing to read out the video signal VR from the delaying portion 203.

In the present embodiment, the video signal VI is used as information for determining whether flash enters or not in the imaging apparatus 2. However, the present embodiment is not limited to such an example. For example, a dedicated sensor for detecting flash itself may be provided on the imaging apparatus 2, and the flash detection signal FD may be generated with the signal obtained from the sensor.

<<Variation>>

Figure 12:
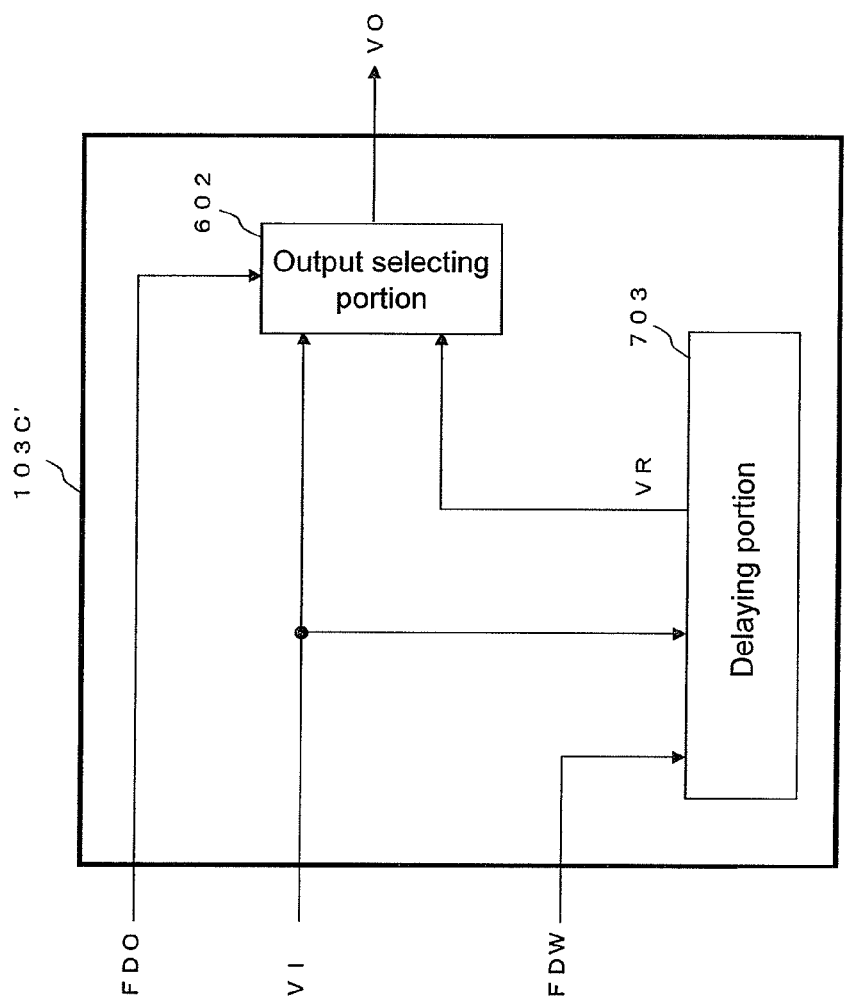
FIG. 12 is a block diagram of an flash correction unit 103C' of the second embodiment.

In the imaging apparatus 2, the flash correcting unit 103B' may be replaced with a flash correcting unit 103C' shown in FIG. 12. As shown in FIG. 12, the flash correcting unit 103C' has a structure in which the flash detection signal FDW is put under control of a delaying portion 703, thereby omitting the first selecting portion 601.

In this imaging apparatus (imaging apparatus of the present variation), the delaying portion 703 stops receiving the video signal VW input for delaying by one field when the value of the FDW is "1" and maintains the value of the prior field. Specifically, at the delaying portion 703, in the field where the video of "screen 3" is input, the video signal of the upper portion of "screen 3" is received as a signal to be delayed by one field (is input into the delaying portion 703), is delayed by one field, and is output at the next field. On the other hand, at the delaying portion 703, the video signal of the lower portion of "screen 3" is ignored (is not input to the delaying portion 703). Instead, the delaying portion 703 maintains the video signal of the lower portion of "screen 2" received at the prior field as it is, and outputs the video signal of the lower portion of "screen 2" at the next field.

With such a structure, in this imaging apparatus (the imaging apparatus of the present variation), the video signal VR same as that in the structure shown in FIG. 11 can be acquired. When the delaying portion 703 of such imaging apparatus is implemented with a semiconductor memory, a writing permission is not to be given to the delaying portion 703 when the flash detection signal FDW is "1". In this way, one of selecting portions (corresponding to the first selecting portion 601) can be omitted.

Third Embodiment

In the present embodiment, flows of the signals are almost same as those in the first embodiment, and mainly, the structure and the operations of the flash correction unit 103 are different. Hereinafter, such differences will be mainly described.

<3.1: Structure of Imaging Apparatus>

Figure 14:
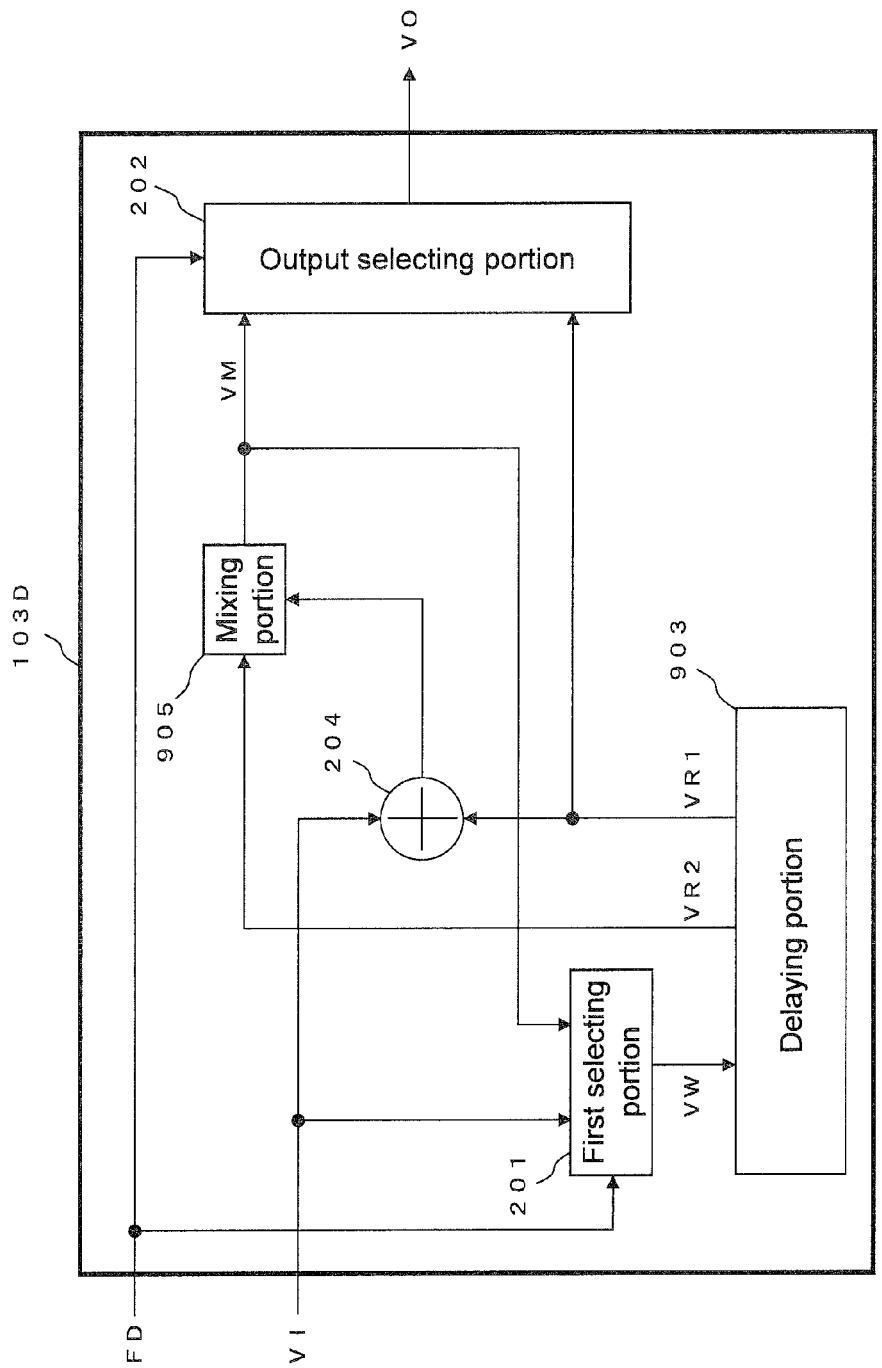
FIG. 14 is a block diagram of an flash correction unit 103D of the third embodiment.

An imaging apparatus of the present embodiment is the imaging apparatus 1 of the first embodiment with the flash correction unit 103 being replaced with a flash correction unit 103D shown in FIG. 14.

The flash correction unit 103D is different from the flash correction unit 103 of the first embodiment on the following points.

Specifically, as shown in FIG. 14, in the flash correction unit 103D:

(1) a mixing portion 905 is added after the adding portion 204;

(2) a signal VR2 which is the output signal of the first selecting portion 201 delayed by two fields by a delaying portion 903 is input to the mixing portion 905; and (3) the delaying portion 903 is made possible to generate the signal VR2 which is delayed by two fields.

Herein, the mixing portion 905 mixes the video signal output from the adding portion 204 and the video signal VR2 obtained by delaying the video signal VW by two fields at a ratio of 7 to 1.

<3.2: Operations of Imaging Apparatus>

The operations of the imaging apparatus of the present embodiment which includes the flash correcting unit 103D having the above described structure are described with reference to FIG. 16. The video of the field prior to "screen 1" of FIG. 16 is referred to as "screen 0", and "screen 0" is not affected by external flash.

Figure 16:
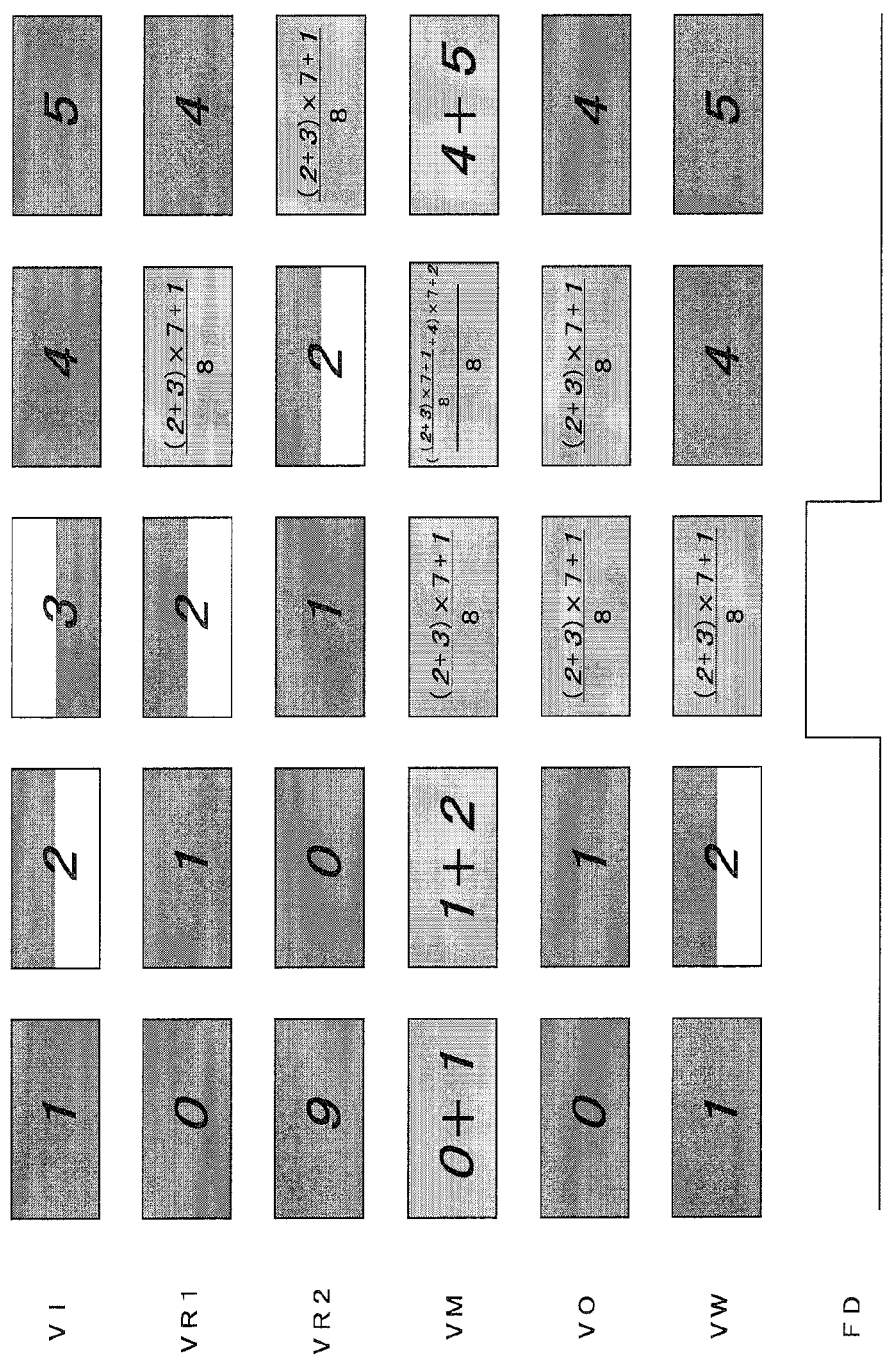
FIG. 16 is a diagram showing video at each part in the third embodiment.

As shown in FIG. 16, with the video signal VI output from the imaging unit 101, a lower portion of the screen is brightened due to effects of flash at "screen 2" and an upper portion of the screen is brightened due to effects of flash at "screen 3". Such a video signal VI is input to the flash correction unit 103D.

(At "Screen 1", "Screen 2", and "Screen 5"):

When "screen 1", "screen 2", or "screen 5" is input, as in the first embodiment, the video signal which is the video signal VI delayed by one field is the output signal VO of the flash correction unit 103D as shown in FIG. 16.

(At "Screen 3"):

When "screen 3" is input, at the adding portion 204, the video signal of "screen 2", which is the video signal VR1 obtained by delaying the video signal VW by one field from the delaying portion 903, and the video signal VI output from the imaging unit 101, that is, the video signal of "screen 3", are added. The obtained signal is output to the mixing portion 905. The video signal obtained by adding the video signal of "screen 2" and the video signal of "screen 3" is mixed with the video signal VR2 obtained by delaying the video signal VW output from the delaying portion 903 by two fields, that is, the video signal of "screen 1", at a ratio of 7 to 1 at the mixing portion 905 to generate the video signal VM.

In other words, the video signal VM is generated by the flash correcting unit 103D as a signal having a signal value acquired from:

$$((\text{Screen 2})+(\text{Screen 3}))\times(7/8)+(\text{Screen 1})\times(1/8).$$

In the above formula, "(screen N)" (N: integer) denotes a signal value of the video signal of "screen N".

As the value of the flash detection signal FD is "1", the output selecting portion 202 selects the video signal VM to be the output signal VO of the flash correcting unit 103D. Accordingly, the output signal VO of the flash correcting unit 103D is the video signal which is obtained by mixing the video signal obtained by adding the video signal of "screen 2" and the video signal of "screen 3" with the video signal of "screen 1" at a ratio of 7 to 1.

As the value of the flash detection signal FD is "1", the mixed video signal VM is selected at the first selecting portion 201 and is output to the delaying portion 903. Herein, a process of mixing at a ratio of 7 to 1 at the mixing portion is to add the signal multiplied by seven eighth and the signal multiplied by one eighth. The mixing ratio is described to be 7 to 1 in the above example. However, the ratio is not limited to such an example, and other mixing ratios may be employed. Further, instead of the adding process, an adding and averaging process, weighted averaging process or the like may be used.

(At "screen 4"):

Next, when the video signal of "screen 4" is input from the imaging unit 101, operations are same as those when the video signal of "screen 1" is input, but there is a difference in that the video signal VR1 delayed by one field at the delaying portion 903 is the video signal which is obtained by mixing the video signal obtained by adding the video signal of "screen 2" and the video signal of "screen 3" with the video signal of "screen 1" at a ratio of 7 to 1 at the prior field.

Accordingly, since the output of the output selecting portion 202 is the video signal VR1, as shown in FIG. 16, the output signal VO of the flash correcting unit 103D is the video signal which is obtained by mixing the video signal obtained by adding the video signal of "screen 2" and the video signal of "screen 3" with the video signal of "screen 1" at a ratio of 7 to 1 as in the prior field.

On the other hand, as the value of the flash detection signal FD is "0", the video signal of "screen 4" which is the video signal output from the imaging unit 101 is selected at the first selecting portion 201 and is output to the delaying portion 903 as the video signal VW.

With the above operations, in the imaging apparatus according to the present embodiment, by combining the video signal of "screen 2" with the screen lower portion being bright due to effects of flash and the video signal of "screen 3" with the screen upper portion being bright due to effects of flash as the video signal VI of FIG. 16, video with an entirely bright screen can be obtained in a period corresponding to "screen 2" and "screen 3" as the video signal VO in FIG. 16. In the imaging apparatus of the present embodiment, video which can roughly show what kind of video it is can be obtained even where (when) overflow occurs in addition. As the imaging apparatus of the present embodiment uses video which is affected by flash (video affected by flash is used instead of being completely deleted), it becomes possible to know whether flash enters or not in the video formed of video signals output from the imaging apparatus of the present embodiment.

When the video signal generated at the imaging unit 101 has an interlace format, for adding the video signal at the adding portion 204 of FIG. 14, the video signal VI is shifted in a vertical direction by 0.5 lines for correction so as to have the same vertical screen position with the video signal VR1 before adding the video signals at the adding portion 204 of FIG. 14. With such an operation, an amount of delay becomes different from as that described above. However, adjustment can be made by changing the timing to read out the video signal VR1 from the delaying portion 903.

In the imaging apparatus of the present embodiment, the video signal VI is used as information for determining whether flash enters or not. However, the present embodiment is not limited to such an example. For example, a dedicated sensor for detecting flash itself may be provided on the imaging apparatus of the present embodiment, and the flash detection signal FD may be generated with the signal obtained from the sensor.

<<Variation>>

Figure 15:
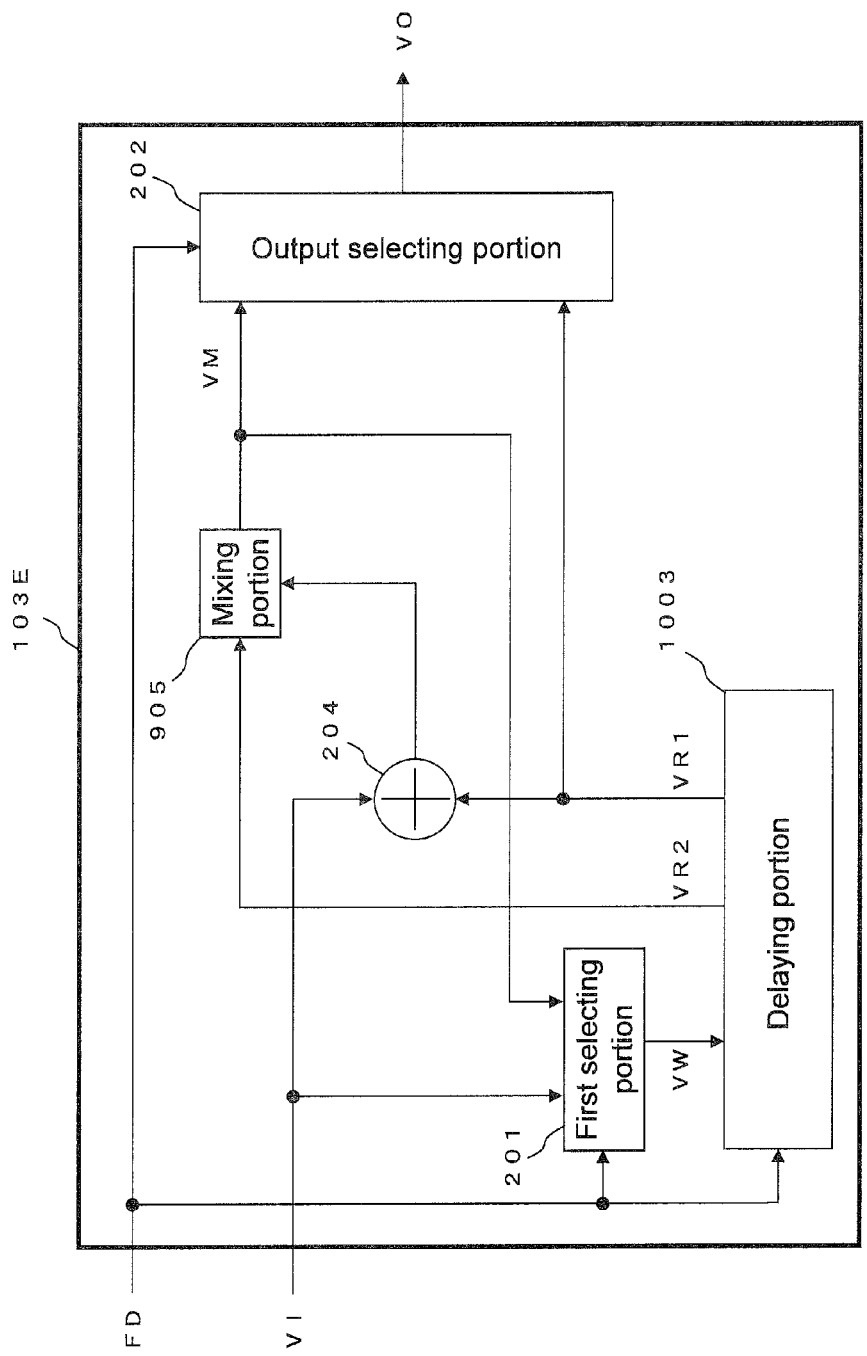
FIG. 15 is a block diagram of an flash correction unit 103E of the third embodiment.

In the imaging apparatus of the present embodiment, the flash correcting unit 103D may be replaced with a flash correcting unit 103E shown in FIG. 15. As shown in FIG. 15, the flash correcting unit 103E has a structure in which the delaying portion 903 in the flash correcting unit 103D is replaced with a delaying portion 1003. Specifically, in this structure, the flash detection signal FD is input to the delaying portion 1003, and the delaying portion 1003 is controlled by the flash detection signal FD.

The delaying portion 1003 outputs the video signal VR2 only when the value of the flash detection signal FD is "1". In this way, the power consumption can reduced cut in the imaging apparatus for a part while the reading process by the delaying portion 1003 being stopped.

Further, a process of the adding portion 204 shown in FIGS. 14 and 15 may be replaced by adding and averaging. In this way, it becomes possible to know an object lighted with flash. However, as the effects of flash are lessened, impression that strong light enters is weakened.

In the present embodiment, the example of mixing video the of "screen 1" has been described. However, similar effects can be obtained by mixing video of "screen 4".

In the present embodiment, three screens (fields) are mixed ("screen 1", "screen 2" and "screen 3" are mixed in the above example). However, the present embodiment is not limited to such an example, and a larger number of screens (fields) may be mixed.

Other Embodiments

In the above examples, processes in field units have been described. However, the present invention is not limited to such examples, and the imaging apparatus may perform processes in frame units, for example.

Further, in the imaging apparatus described with reference to the above embodiments, the blocks may be formed into one chip independently with a semiconductor device such as LSI, or some or all of them may be formed into one chip.

Herein, it is referred to as LSI, but depending upon the integration degrees, they may also be referred to as IC, system LSI, super LSI, ultra LSI, and so on.

Furthermore, the method of integrating circuit is not limit to LSI, but may be embodied as a special purpose circuit, or a general purpose processor. A field programmable gate array (FPGA), which can be programmed after LSI is manufactured, or a re-configurable processor, in which connections or settings of circuit cells inside the LSI can be reconfigured, may be used.

Further, in advent of technology of integrating circuit replacing LSI due to advance in semiconductor technologies or other technologies derived thereof, the functional blocks may be integrated using such technology. Application of biotechnology is a possible example.

The processes in the above-described embodiments may be performed by hardware or may be performed by software (including cases of implementing with an operating system (OS), a middleware, or a predetermined library). Further, they can be performed by both software and hardware. When the imaging apparatus according to the above embodiments is implemented by the hardware, of course, timing adjustment for each of the processes is needed. In the above embodiment, for the sake of convenience in description, details on timing adjustment for various signals which is required in the actual hardware design are omitted.

The orders for performing the process methods in the above embodiments are not limited to those described in the above embodiments. The order can be reordered without departing from the scope and spirit of the invention.

The specific structures of the present invention are not limited to the above-described embodiments. Various change and modifications can be made without departing from the scope and spirit of the present invention.

INDUSTRIAL APPLICABILITY

The imaging apparatus, imaging method, program, and integrated circuits according to the present embodiments can prevent a horizontal band of a high brightness caused by external flash from appearing on taken video (image), and still allow to output video (image) with secured continuity as a moving image. Thus, they are useful for digital cameras, video cameras or the like for taking continuous images.

REFERENCE SIGNS LIST 1, 200 Imaging apparatus
101 Imaging unit
102 Flash detection unit
103, 103A, 103B, 103C, 103D, 103E Flash correction unit
201, 601 First selecting portion
202, 602 Output selecting portion
203, 703, 903, 1003 Delaying portion
204 Adding portion
404 Adding and averaging portion
905 Mixing portion

The invention claimed is:

1. An imaging apparatus, comprising:
an imaging unit which has an imaging element and is operable to convert an optical signal incident from an object into an electrical signal to acquire and output a video signal, the video signal forming a unit image;
a flash detection unit operable to detect whether the video signal acquired by the imaging unit is affected by flash or not; and
a flash correction unit that, when the video signal acquired by the imaging unit is determined by the flash detection unit to be affected by flash, generates a corrected video signal using the video signal determined to be affected by flash, and replaces the video signal determined to be affected by flash with the corrected video signal.

2. The imaging apparatus according to claim 1, wherein:
when the flash detection unit determines that an Nth video signal, which is a video signal forming an Nth unit image (N is integer), and an (N+1)th video signal, which is a video signal forming an (N+1)th unit image (N is integer), are affected by flash,
the flash correction unit generates the corrected video signal using the Nth video signal and the (N+1)th video signal, and corrects the video signal output from the imaging unit by replacing the video signal output from the imaging unit with the corrected video signal.

3. The imaging apparatus according to claim 1, wherein:
the flash correction unit has
a first selecting portion operable to receive a plurality of video signals as inputs and to select one of the plurality of input video signals to output a selected video signal, based on a detection result at the flash detection unit,
a delaying portion operable to delay the selected video signal output from the first selecting portion by a unit image time period to output a delayed video signal, the unit image time period being a time period corresponding to the unit image,
an adding portion operable to treat the video signal output from the imaging unit and the delayed video signal output from the delaying portion with an adding process to output san added video signal, and
an output selecting portion operable to select and output either the added video signal output from the adding portion or the delayed video signal output from the delaying portion;
the first selecting portion is operable to receive the video signal output from the imaging unit and the added video signal output from the adding portion as inputs, and, when the flash detection unit determines that the video signal output from the imaging unit is not affected by flash, select and output the video signal output from the imaging unit, and, when the flash detection unit determines that the video signal output from the imaging unit is affected by flash, to select and output the added video signal output from the adding portion; and
the output selecting portion is operable to select and output the delayed video signal output from the delaying portion when the flash detection unit determines that the video signal output from the imaging unit is not affected by flash, and, when the flash detection unit determines that the video signal output from the imaging unit is affected by flash, to select and output the added video signal output from the adding portion.

4. The imaging apparatus according to claim 3, wherein:
the adding portion performs the adding process by adding the video signal output from the imaging unit and the delayed video signal output from the delaying portion.

5. The imaging apparatus according to claim 3, wherein:
the adding portion performs the adding process by adding and averaging the video signal output from the imaging unit and the delayed video signal output from the delaying portion.

6. The imaging apparatus according to claim 1, wherein:
the flash detection unit detects whether the video signal acquired by the imaging unit is affected by flash or not and retains a detection result that is prior by one unit image time period, which is a time period corresponding to the unit image,
the flash correction unit has
a first selecting portion operable to receive a plurality of video signals as inputs and to select one of the plurality of input video signals to output a selected video signal, based on the detection result at the flash detection unit,
a delaying portion operable to delay the selected video signal output from the first selecting portion by one unit image time period to output a delayed video signal, and
an output selecting portion operable to select and output either the video signal output from the imaging unit or the delayed video signal output from the delaying portion;
when the flash detection unit determines that the video signal corresponding to a lower portion of a screen of a unit image formed of a video signal that is prior by one unit image is affected by flash, the first selecting portion selects and outputs the delayed video signal output from the delaying portion for a period of time corresponding to the lower portion of the screen in the unit image being processed, and, otherwise, selects and outputs the video signal output from the imaging unit; and
when the flash detection unit determines that the video signal corresponding to an upper portion of a screen of a unit image formed of a video signal is affected by flash, the output selecting portion selects and outputs the video signal output from the imaging unit for a period of time corresponding to the upper portion of the screen in a unit image being processed, and, otherwise, selects and outputs the video signal output from the delaying portion.

7. The imaging apparatus according to claim 1, wherein:
the flash detection unit detects whether the video signal acquired by the imaging unit is affected by flash or not and retains a detection result that is prior by one unit image time period, which is a time period corresponding to the unit image,
the flash correction unit comprises
a delaying portion which, when the flash detection unit determines that the video signal corresponding to a lower portion of a screen of a unit image formed of a video signal that is prior by one unit image is affected by flash, does not receive the video signal output from the imaging unit for a period of time corresponding to the lower portion of the screen in the unit image being processed, and delays and outputs the video signal received from the imaging unit at a time that is prior by one unit image time period with a further delay of one image unit time period, and otherwise, delays and outputs the video signal from the imaging unit with a delay of one unit image time period, and a selecting portion which, when the flash detection unit determines that the video signal corresponding to an upper portion of a screen of a unit image formed of a video signal is affected by flash, selects and outputs the video signal output from the imaging unit to output for a period of time corresponding to the upper portion of the screen in the unit image being processed, and, otherwise, selects and outputs the delayed video signal output from the delaying portion.

8. The imaging apparatus according to claim 1, wherein:
the flash detection unit detects whether the video signal acquired by the imaging unit is affected by flash or not and retains a detection result that is prior by one unit image time period, which is a time period corresponding to a unit image formed of a video signal,
the flash correction unit comprises
a first selecting portion operable to receive a plurality of video signals as inputs and to select one of the plurality of input video signals to output a selected video signal, based on a detection result at the flash detection unit,
a delaying portion operable to output a first delay signal obtained by delaying the selected video signal output from the first selecting portion by one unit image time period and a second delay signal obtained by delaying the first delay signal by one unit image time period,
an adding portion operable to treat the video signal output from the imaging unit and the first delay signal output from the delaying portion with an adding process and to output an added video signal treated with the process,
a mixing portion operable to mix the added video signal output from the adding portion and the second delay signal at a predetermined ratio to output a mixed video signal, and
an output selecting portion operable to select and output either the mixed video signal output from the mixing portion or the first delay signal output from the delaying portion;
the first selecting portion receives the video signal output from the imaging unit and the added video signal output from the adding portion as inputs, and, when the flash detection unit determines that the video signal output from the imaging unit is not affected by flash, selects and outputs the video signal output from the imaging unit, and, when the flash detection unit determines that the video signal output from the imaging unit is affected by flash, selects and outputs the mixed video signal output from the mixing portion; and
the output selecting portion selects and outputs the first delay signal output from the delaying portion when the flash detection unit determines that the video signal output from the imaging unit is not affected by flash, and, when the flash detection unit determines that the video signal output from the imaging unit is affected by flash, selects and outputs the mixed video signal output from the mixing portion.

9. The imaging apparatus according to claim 8, wherein:
the delaying portion outputs the second delay signal only when the flash detection unit determines that the video signal output from the imaging unit is affected by flash.

10. The imaging apparatus according to claim 1, wherein:
the unit image is a field image; and
the unit image time period is a field time period.

11. The imaging apparatus according to claim 1, wherein:
the flash detection unit performs
detecting whether the video signal acquired by the imaging unit is affected by flash or not in either pixel units, line units, or field units,
generating a first flash determination signal which outputs a value indicating effects of flash only for a time period corresponding to a screen area which is affected by flash in a screen of an image formed of the video signal,
generating a second flash determination signal which outputs a value indicating effects of flash only for a time period corresponding to the entire screen when it is determined that there are effects of flash at a start time of the screen of the image formed of the video signal, and
generating a third flash determination signal which outputs a value indicating effects of flash only for a time period corresponding to the entire screen when it is determined that there are effects of flash only in a lower portion of the screen of the image formed of the video signal; the flash detection unit being able to:
delay the first flash determination signal, the second flash determination signal, and the third flash determination signal, respectively, for a predetermined time period, and
output one or a plurality of the flash determination signal, the second flash determination signal, and the third flash determination signal and signals obtained by delaying the first flash determination signal, the second flash determination signal, and the third flash determination signal by a predetermined period.

12. The imaging apparatus according to claim 3, wherein:
the adding portion performs the adding process and the first selecting portion performs selection after matching phases in a vertical direction by shifting one of video signals by 0.5 lines when vertical phases of the two video signals input to the adding portion and the first selecting portion are shifted from each other by 0.5 lines.

13. An imaging method used for an imaging apparatus comprising an imaging unit which has an imaging element and is operable to convert an optical signal incident from an object into an electrical signal to acquire and output a video signal, the video signal forming a unit image, the imaging method comprising:
detecting whether the video signal acquired by the imaging unit is affected by flash or not; and
when the video signal acquired by the imaging unit is determined to be affected by flash in the detecting step, generating a corrected video signal using the video signal determined to be affected by flash, and replacing the video signal determined to be affected by flash with the corrected video signal.

14. A non-transitory computer-readable storage medium storing a program for having a computer perform an imaging method used for an imaging apparatus comprising an imaging unit which has an imaging element and is operable to convert an optical signal incident from an object into an electrical signal to acquire and output a video signal, the video signal forming a unit image, the program for having a computer perform the imaging method comprising:
detecting whether the video signal acquired by the imaging unit is affected by flash or not; and
when the video signal acquired by the imaging unit is determined to be affected by flash in the detecting step, generating a corrected video signal using the video signal determined to be affected by flash, and replacing the video signal determined to be affected by flash with the corrected video signal.

15. An integrated circuit used for an imaging apparatus comprising an imaging unit which has an imaging element and is operable to convert an optical signal incident from an object into an electrical signal to acquire and output a video signal, the integrated circuit comprising:
   a flash detecting unit operable to detect whether the video signal acquired by the imaging unit is affected by flash or not; and
   a flash correcting unit operable to generate a corrected signal using the video signal determined to be affected by flash, and correct the video signal output from the imaging unit using the corrected video signal, when the flash detecting unit determines that the video signal acquired by the imaging unit is affected by flash.

* * * * *